(12) United States Patent
Kim et al.

(10) Patent No.: US 9,325,831 B2
(45) Date of Patent: Apr. 26, 2016

(54) APPARATUS AND METHOD FOR PROCESSING CALL AND MESSAGE-RELATED EVENTS IN A WIRELESS TERMINAL

(71) Applicant: Samsung Electronics Co., Ltd., Suwon-si, Gyeonggi-do (KR)

(72) Inventors: Jae-Ho Kim, Gumi-si (KR); Hyun-Ji Kim, Daegu (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/582,796

(22) Filed: Dec. 24, 2014

(65) Prior Publication Data

US 2015/0119005 A1    Apr. 30, 2015

Related U.S. Application Data

(60) Continuation of application No. 13/567,981, filed on Aug. 6, 2012, now Pat. No. 8,938,225, which is a continuation of application No. 12/314,761, filed on Dec. 16, 2008, now Pat. No. 8,254,899, which is a division of application No. 11/311,357, filed on Dec. 20, 2005, now Pat. No. 7,474,903.

(30) Foreign Application Priority Data

Dec. 20, 2004 (KR) .................. 10-2004-0109023
Dec. 6, 2005  (KR) .................. 10-2005-0118103

(51) Int. Cl.
*H04M 3/42*     (2006.01)
*H04M 1/725*    (2006.01)
(Continued)

(52) U.S. Cl.
CPC ...... *H04M 1/72547* (2013.01); *H04M 1/72544* (2013.01); *H04W 8/18* (2013.01); *H04M 1/27455* (2013.01); *H04M 1/274583* (2013.01); *H04M 2250/56* (2013.01)

(58) Field of Classification Search
CPC . H04W 8/245; H04M 1/72519; H04M 3/533; H04L 29/01108
USPC .............. 455/414.1, 418, 550.1; 379/88.22
See application file for complete search history.

(56) References Cited

U.S. PATENT DOCUMENTS 5,526,401 A    6/1996   Roach, Jr. et al.
5,887,259 A    3/1999   Zicker et al.
(Continued)

FOREIGN PATENT DOCUMENTS

CN    1337819 A    2/2002
CN    1472670 A    2/2004
(Continued)

OTHER PUBLICATIONS

Luke Swartz: "Why people hate the paperclip: labels, appearance, behavior and social responses to user interface agents"; Jun. 12, 2003; Stanford University; pp. 1-11.

(Continued)

*Primary Examiner* — Danh Le
(74) *Attorney, Agent, or Firm* — Jefferson IP Law, LLP

(57) ABSTRACT

A character agent function is added to a wireless terminal and an avatar user interface (UI) for generating and processing an event is expressed when an event occurs in the wireless terminal, such that call and message-related events occurring in the wireless terminal can be expressed through the character agent function.

20 Claims, 33 Drawing Sheets

(51) Int. Cl.
*H04W 8/18* (2009.01)
*H04M 1/2745* (2006.01)

(56) References Cited

U.S. PATENT DOCUMENTS

| | | | |
|---|---|---|---|
| 5,926,539 A | 7/1999 | Shtivelman | |
| 5,930,295 A | 7/1999 | Isley, Jr. et al. | |
| 6,088,731 A | 7/2000 | Kiraly et al. | |
| 6,154,648 A | 11/2000 | Comer | |
| 6,381,474 B1 | 4/2002 | Kraft | |
| 6,430,409 B1 | 8/2002 | Rossmann | |
| 6,839,568 B2 | 1/2005 | Suzuki | |
| 6,859,625 B2 | 2/2005 | Sawada | |
| 7,292,850 B2 | 11/2007 | Itabashi | |
| 7,327,834 B1 | 2/2008 | Hiers et al. | |
| 7,441,015 B2 | 10/2008 | Ruellan et al. | |
| 7,627,549 B1 | 12/2009 | Hiltunen et al. | |
| 8,473,782 B2 | 6/2013 | Park | |
| 2001/0044295 A1* | 11/2001 | Saito et al. | 455/410 |
| 2001/0046853 A1 | 11/2001 | Aoyama et al. | |
| 2002/0131402 A1* | 9/2002 | Lee et al. | 370/352 |
| 2003/0129973 A1* | 7/2003 | Oishi et al. | 455/414 |
| 2003/0154249 A1* | 8/2003 | Crockett et al. | 709/204 |
| 2004/0203769 A1* | 10/2004 | Sakanaba | 455/435.1 |
| 2004/0225718 A1 | 11/2004 | Heinzel et al. | |
| 2005/0075079 A1 | 4/2005 | Jei et al. | |
| 2005/0083915 A1 | 4/2005 | Mathew et al. | |
| 2005/0114456 A1 | 5/2005 | Mathew et al. | |
| 2005/0130631 A1 | 6/2005 | Maguire et al. | |
| 2005/0166072 A1 | 7/2005 | Converse et al. | |
| 2005/0207358 A1 | 9/2005 | Nishida et al. | |
| 2006/0046746 A1 | 3/2006 | Ranford et al. | |
| 2006/0082437 A1* | 4/2006 | Yuhara | 340/5.82 |
| 2007/0192174 A1 | 8/2007 | Bischoff | |
| 2010/0099397 A1 | 4/2010 | Belmonte et al. | |
| 2010/0274587 A1 | 10/2010 | Gamboa et al. | |
| 2014/0100900 A1 | 4/2014 | Abhyanker | |

FOREIGN PATENT DOCUMENTS

| | | |
|---|---|---|
| EP | 1309158 A2 | 5/2003 |
| EP | 1387241 A2 | 2/2004 |
| KR | 10-2003-0045303 A | 6/2003 |
| KR | 10-2004-0077185 A | 9/2004 |
| WO | 2004/098162 A1 | 11/2004 |

OTHER PUBLICATIONS

Muller W. et al.: "Face-to-face with your assistant; Realization issues of animated user interface agents for home appliances" Computer and Graphics, Pergamon Press Ltd. Oxford, GB; vol. 25, No. 4, Aug. 20001; pp. 593-600.

"Method for Notifying Caller of Speed Dial Settings"; IBM Technical Disclosure Bulletin, IBM Corp. New York, US; vol. 36, No. 9B; Sep. 1, 1993; pp. 21-22.

* cited by examiner

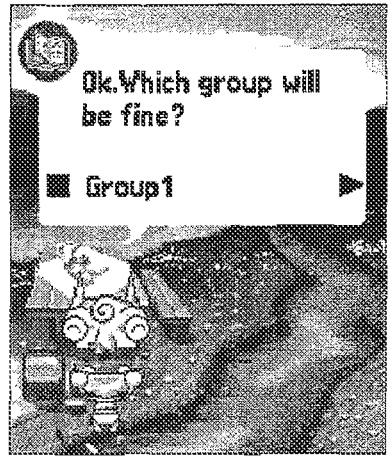
FIG.27A          FIG.27B
FIG.27C          FIG.27D

APPARATUS AND METHOD FOR PROCESSING CALL AND MESSAGE-RELATED EVENTS IN A WIRELESS TERMINAL

PRIORITY

This application is a continuation of U.S. patent application Ser. No. 13/567,981, filed on Aug. 6, 2012, which is a continuation of U.S. patent application Ser. No. 12/314,761, filed on Dec. 16, 2008, now U.S. Pat. No. 8,254,899, which is a division of U.S. patent application Ser. No. 11/311,357, filed on Dec. 20, 2005, now U.S. Pat. No. 7,474,903, which claims the benefit under 35 U.S.C. §119(a) of two Korean applications, both entitled "Apparatus and Method for Processing Call and Message-Related Events in a Wireless Terminal," filed in the Korean Intellectual Property Office on Dec. 20, 2004 and Dec. 6, 2005, and assigned Serial Nos. 2004-109023 and 2005-118103, respectively, the entire contents of all of said prior applications being hereby incorporated by reference.

BACKGROUND OF THE INVENTION

1. Field of the Invention

The present invention generally relates to an agent apparatus and method for use in a wireless terminal. More particularly, the present invention relates to an apparatus and method for implementing a character agent function, and processing a call and message-related events in a wireless terminal.

2. Description of the Related Art

Conventionally, a wireless terminal is a portable device carried by a user, and the wireless terminal's representative device is a wireless phone. The wireless phone can serve various supplementary functions as well as a basic phone function. Wireless phones with the supplementary functions may be a camcorder phone with a camera, television (TV) phone through which TV can be watched, Moving Picture Experts Group (MPEG) layer 3 (MP3) through which an MP3 music file can be listened to, digital multimedia broadcasting (DMB) phone through which satellite broadcasting and/or terrestrial broadcasting programs can be watched, and the like. Accordingly, products with supplementary functions capable of processing multimedia data are widely used as the current wireless phones.

The wireless terminals with various supplementary functions conventionally include a liquid crystal display (LCD). Various display methods for effectively displaying information on a display unit of the LCD are being developed such that a user can easily recognize various supplementary functions, and states of a wireless terminal. The wireless terminals are being developed such that various types of user data can be displayed. Currently, user data displayed in the wireless terminals are mainly configured by visual image data such as photo data, character images, animations, and the like. Avatar image data can also be included in the user data, and a need exists for wireless terminals using the avatar image data.

SUMMARY OF THE INVENTION

An aspect of embodiments of the present invention is to address at least the above problems and/or disadvantages and to provide at least the advantages described below. Accordingly, an aspect of embodiments of the present invention is to provide an apparatus and method that can express call and message-related events through a character agent function when the events occur in a wireless terminal.

It is another object of an exemplary embodiment of the present invention to provide an apparatus and method that can analyze call and message-related events occurring in a wireless terminal to select and express a character user interface (UI) provided in an optimum specialist.

It is yet another object of an exemplary embodiment of the present invention to provide an apparatus and method for expressing call and message-related events in a wireless terminal that can select a character user interface (UI) to express a call and message-related event occurring in the wireless terminal under control of a controller.

In accordance with an aspect of an exemplary embodiment of the present invention, there is provided an apparatus for processing call and message-related events in a wireless terminal, comprising: a memory for storing character user interface (UI) images based on call and message-related events; an agent collection unit for collecting the call and message-related events occurring in the wireless terminal and generating an event message for identifying an occurred call and message-related event; an agent control unit, provided with a plurality of specialists for processing the call and message-related events, for selecting a specialist mapped to the event message from the plurality of specialists, selecting and outputting a character UI identifier (ID) based on a call and message-related event of the selected specialist, and processing user feedback information for an associated event in response to the feedback information received from a user; and an agent expression unit for outputting a character and text mapped to the call and message-related event and the feedback information.

In accordance with another aspect of an exemplary embodiment of the present invention, there is provided a method for processing call and message-related events in a wireless terminal, comprising the steps of: analyzing call and message-related records of an associated contact person when a call and message-related contact event occurs; and expressing an alarm event mapped to a result of analyzing the call and message-related records using a character and text.

In accordance with yet another aspect of an exemplary embodiment of the present invention, there is provided a method for processing call and message-related events in a wireless terminal, comprising the steps of: determining a type of an alarm event when the alarm event occurs; analyzing call and message-related records according to the occurred alarm event; and expressing a character and text mapped to a result of analyzing the call and message-related records.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Figure 4:
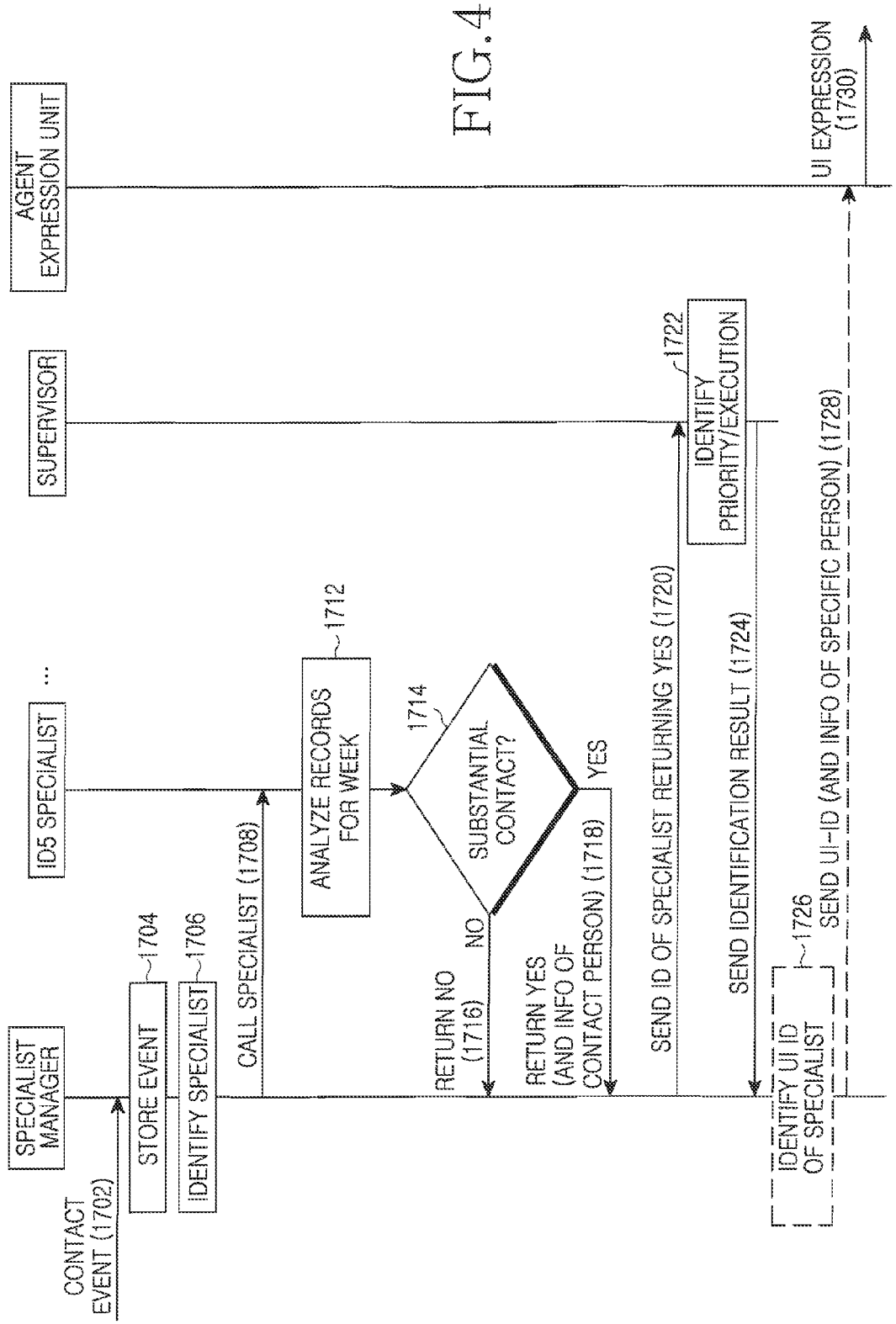
Figure 5:
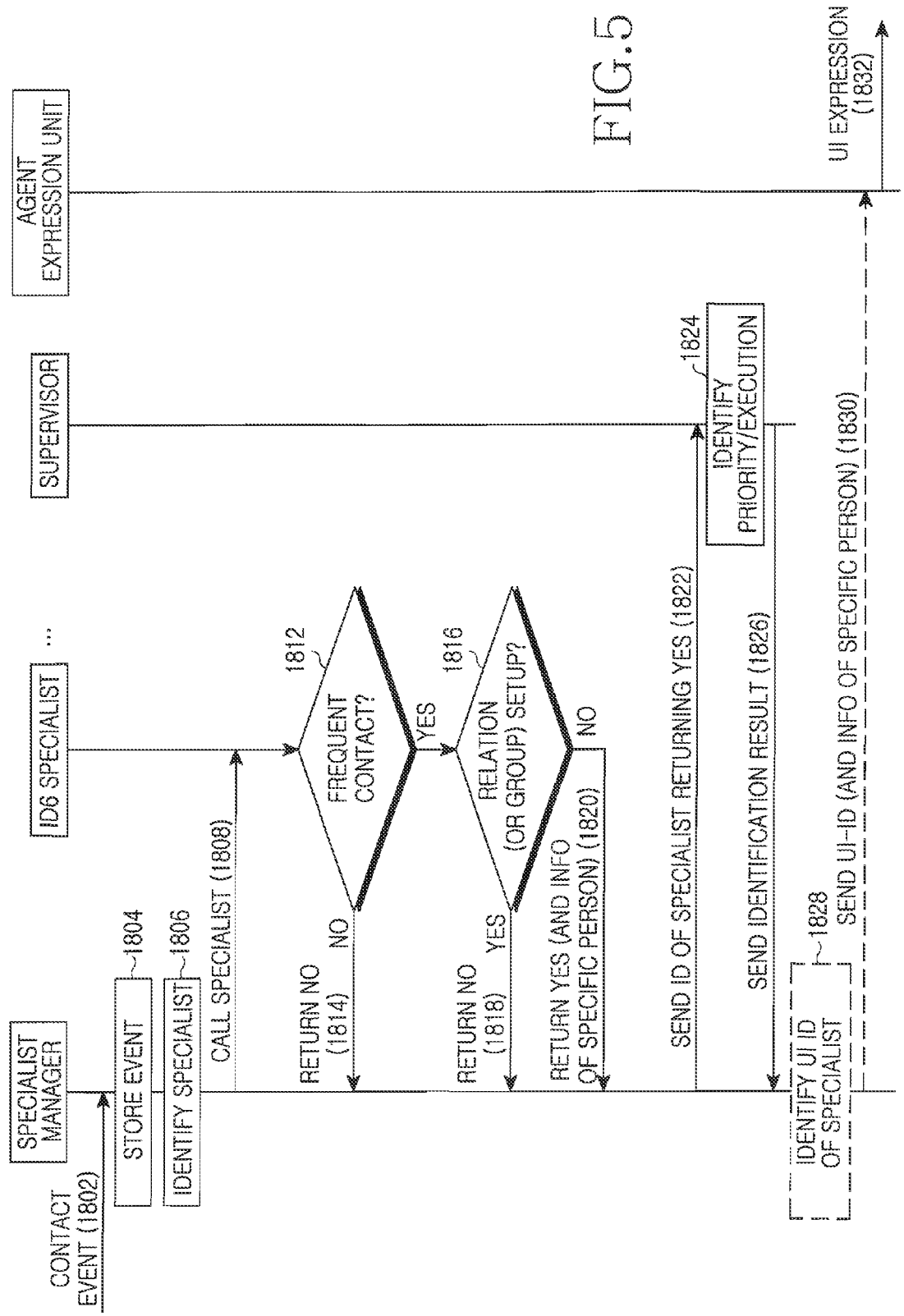
Figure 6:
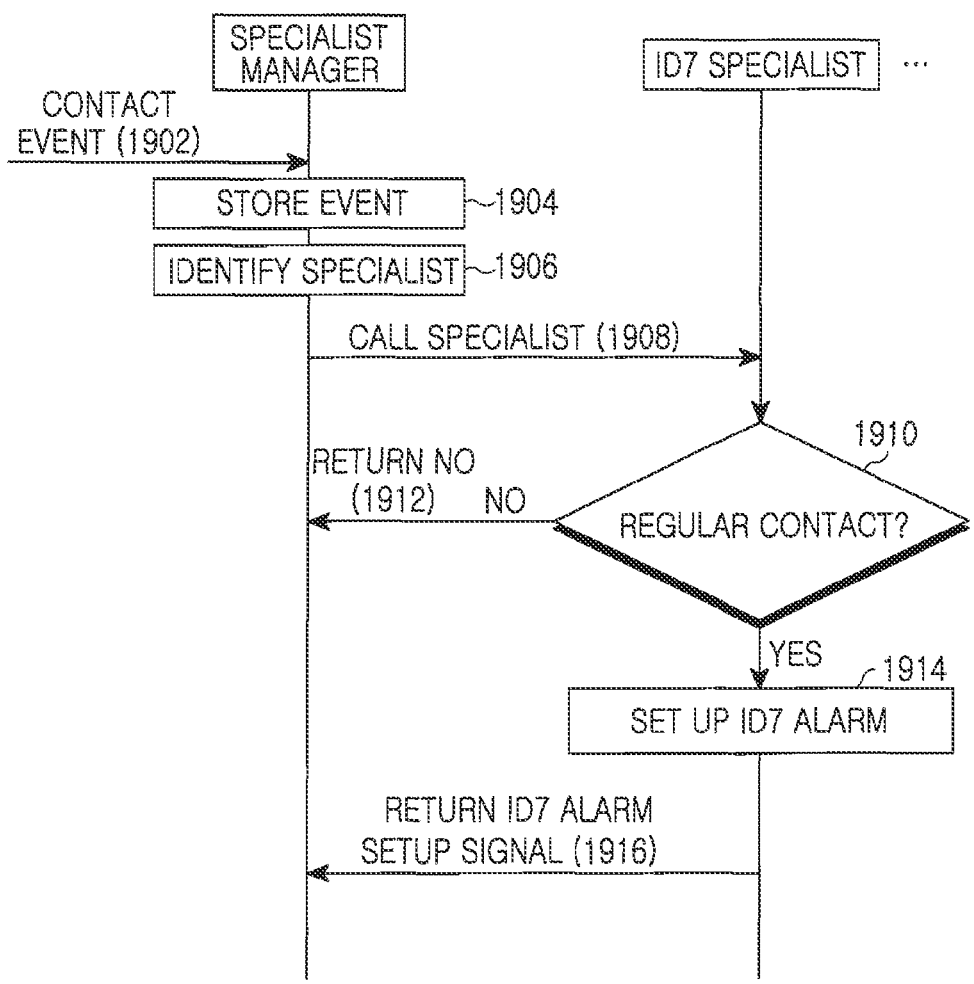
Figure 7:
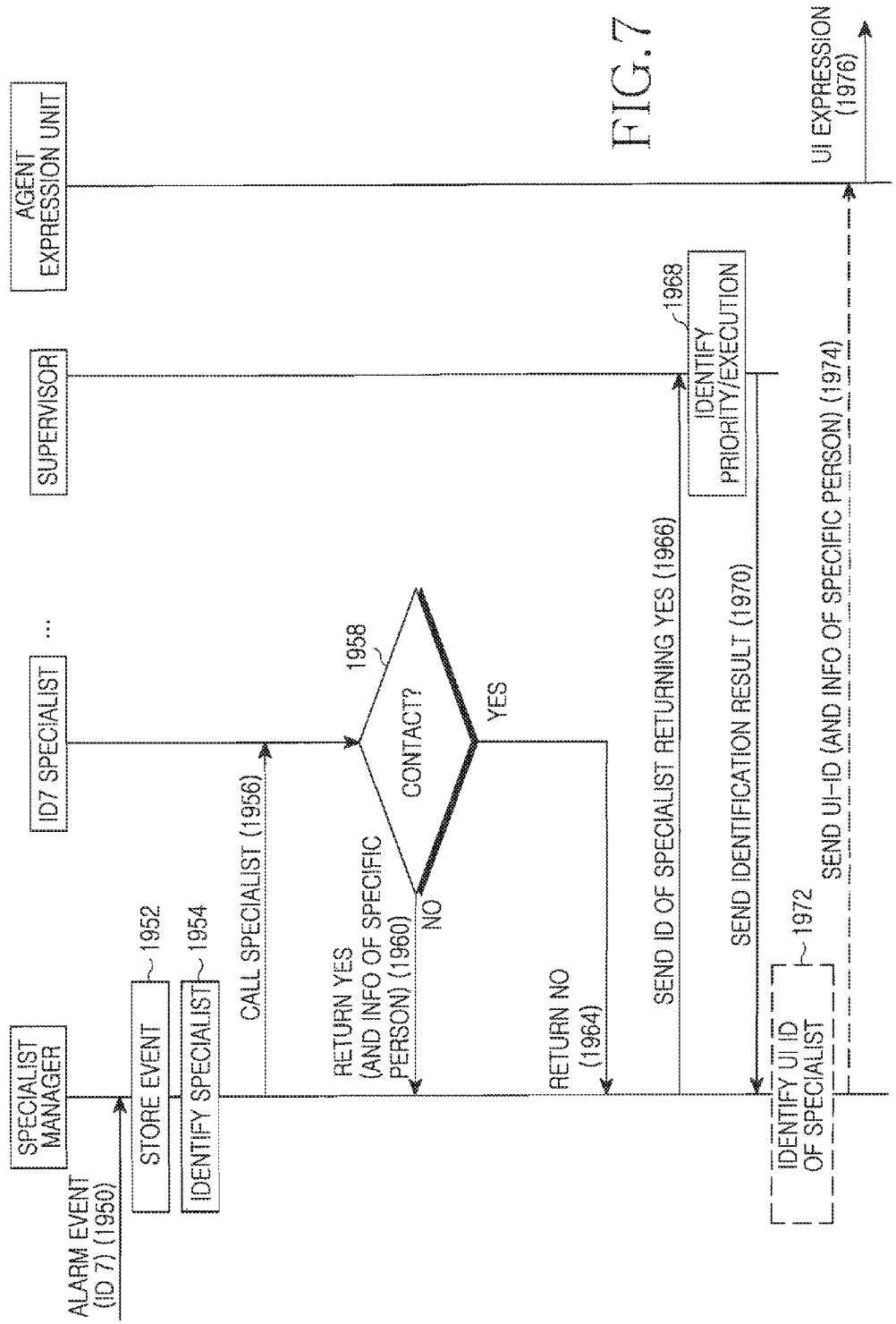
Figure 8:
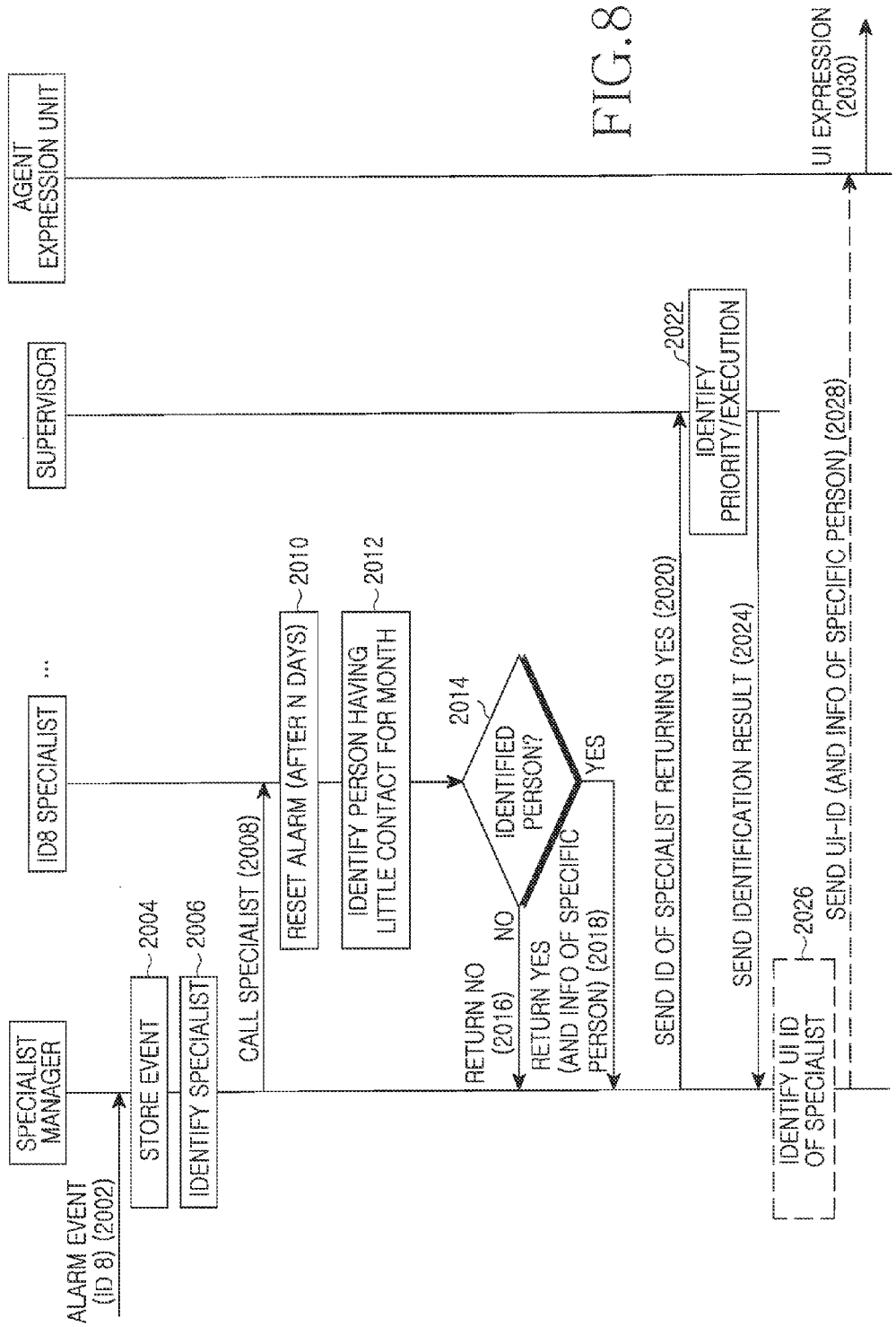
Figure 9:
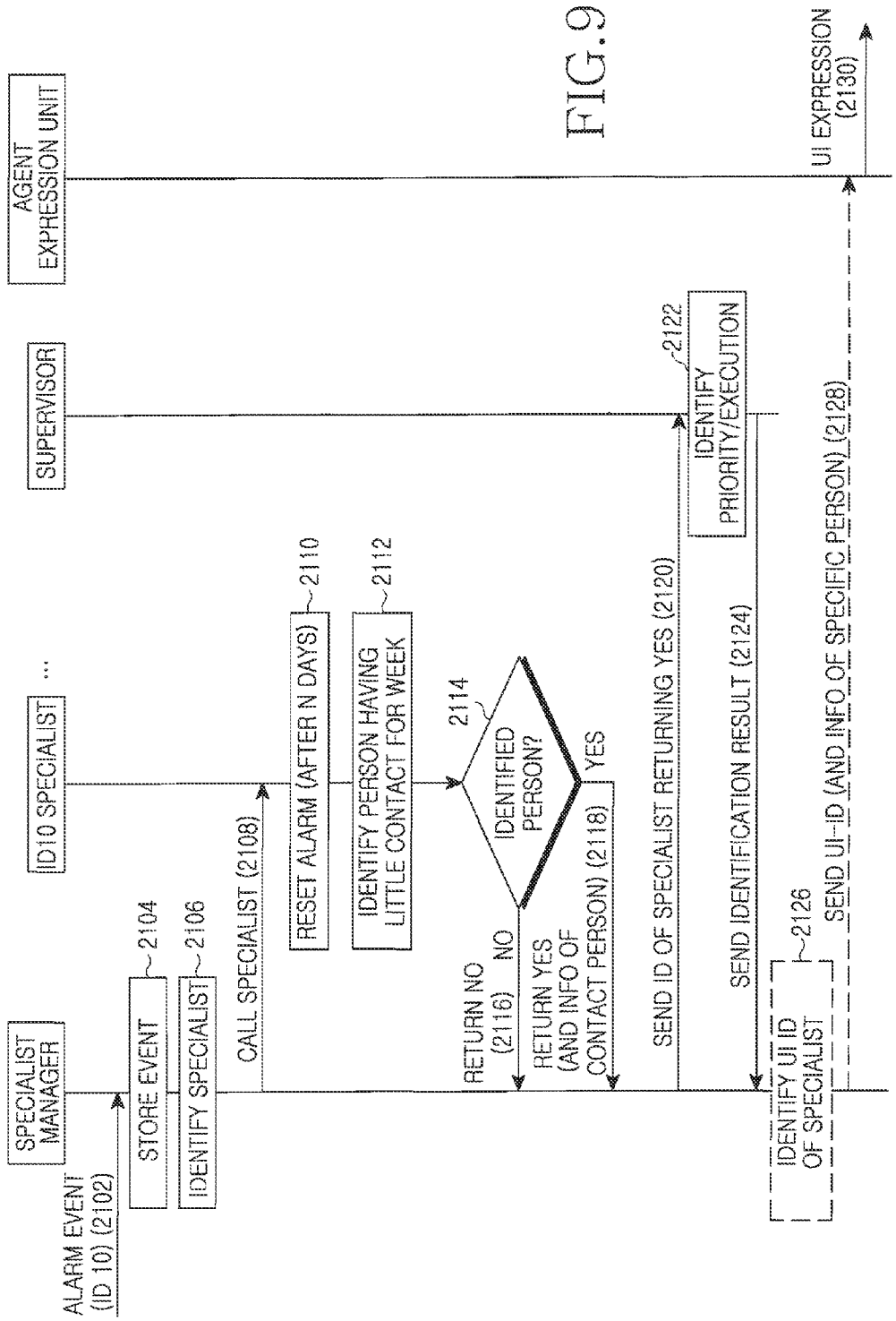
Figure 10:
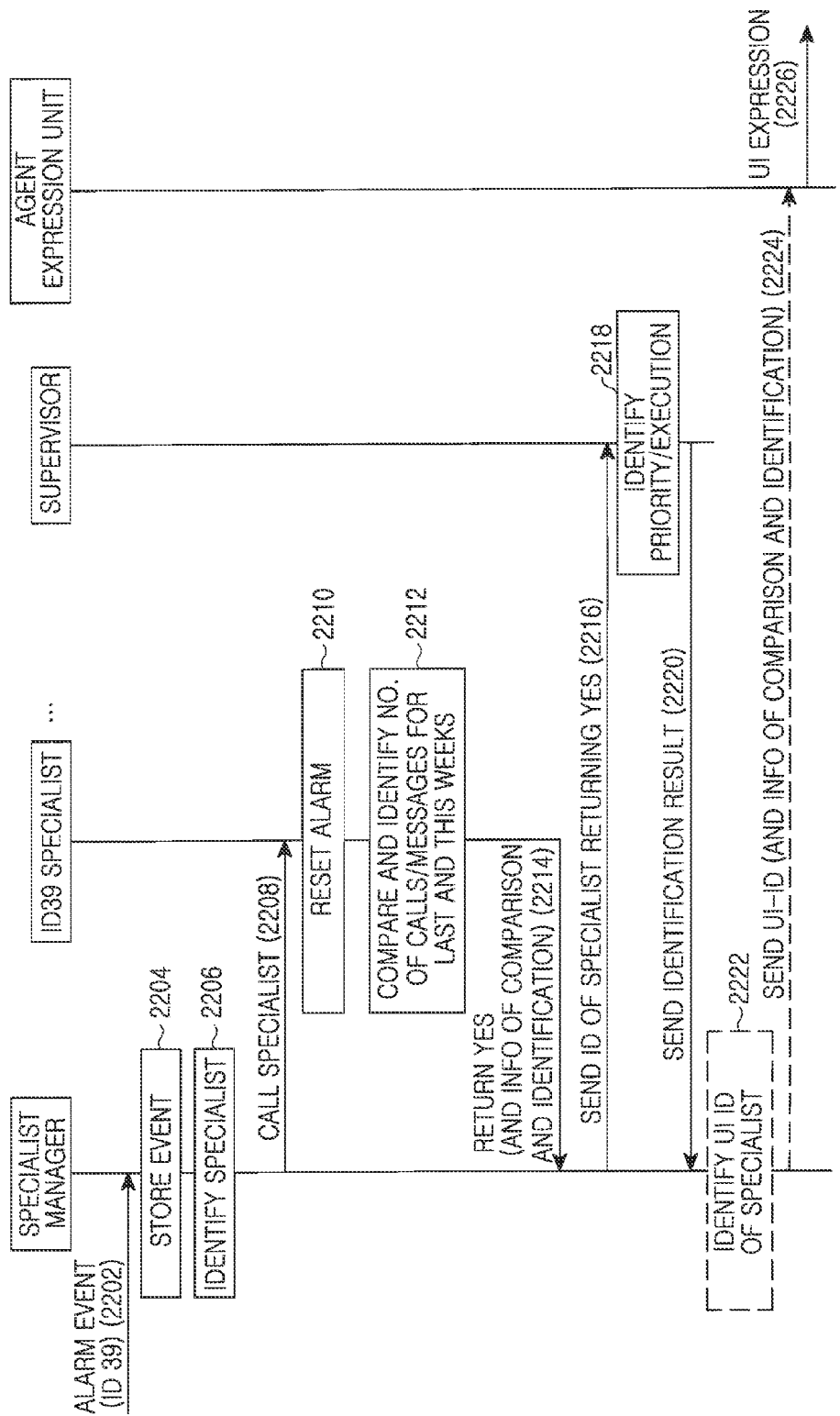
Figure 11:
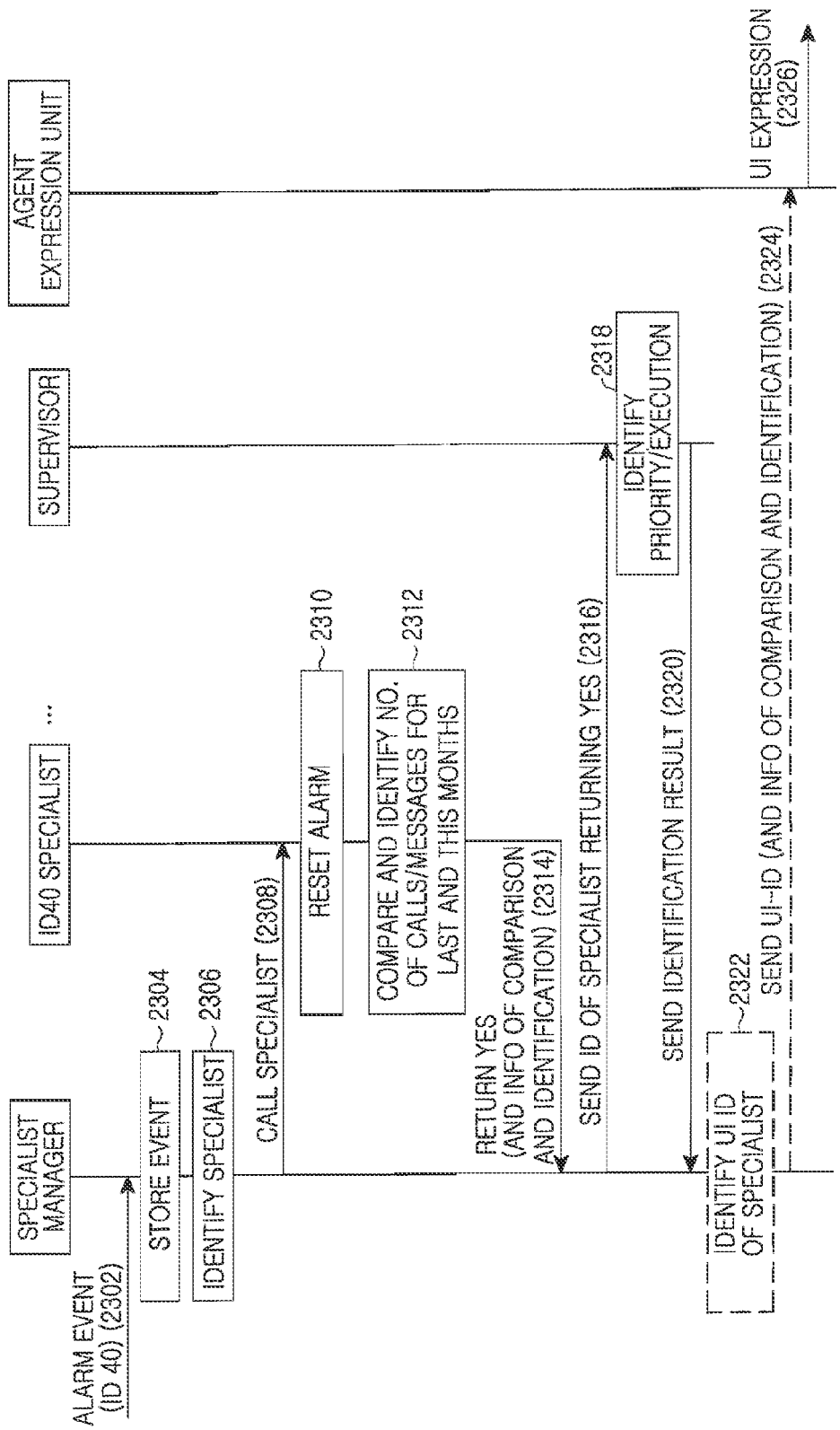
Figure 12:
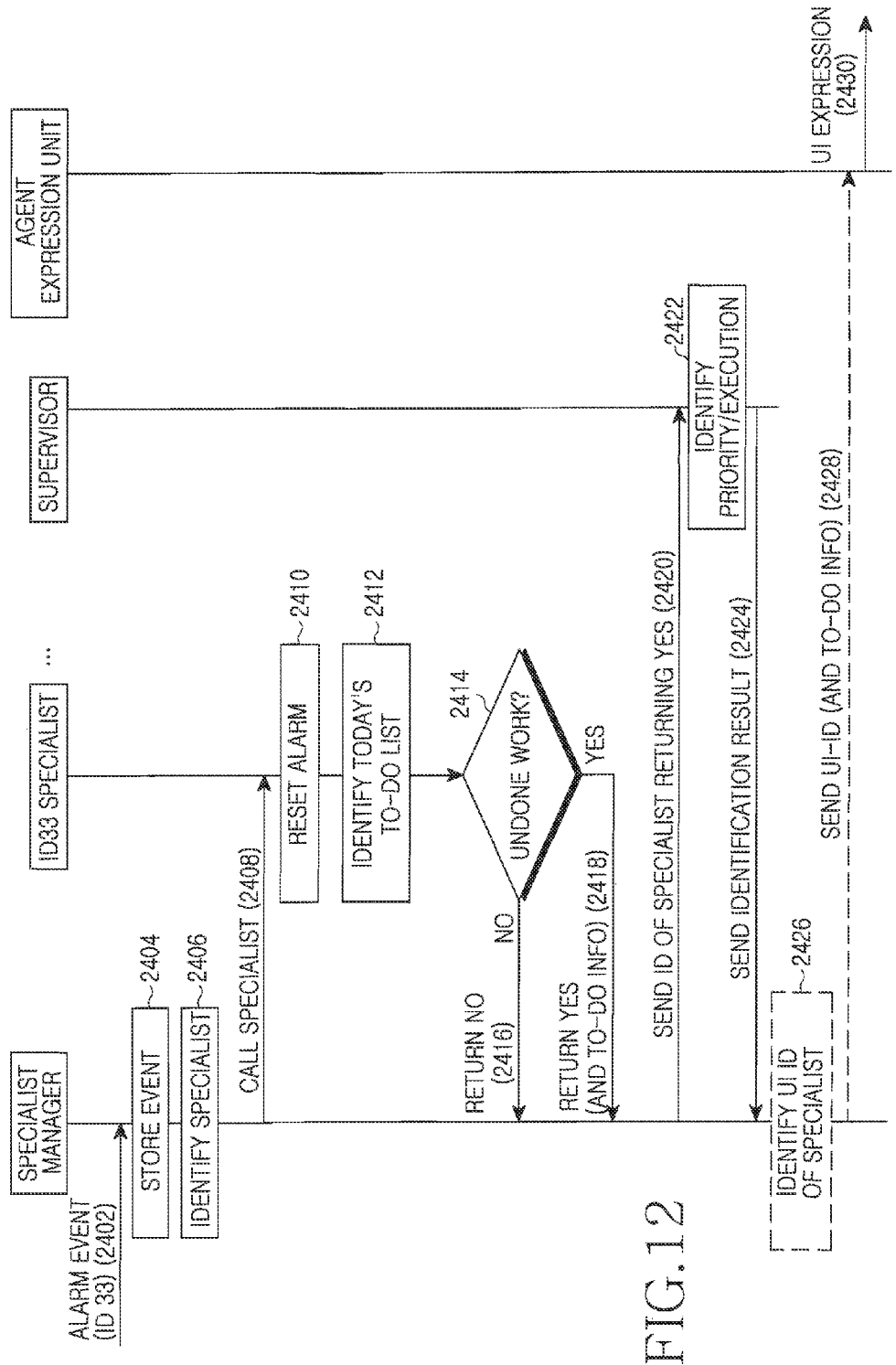
Figure 13:
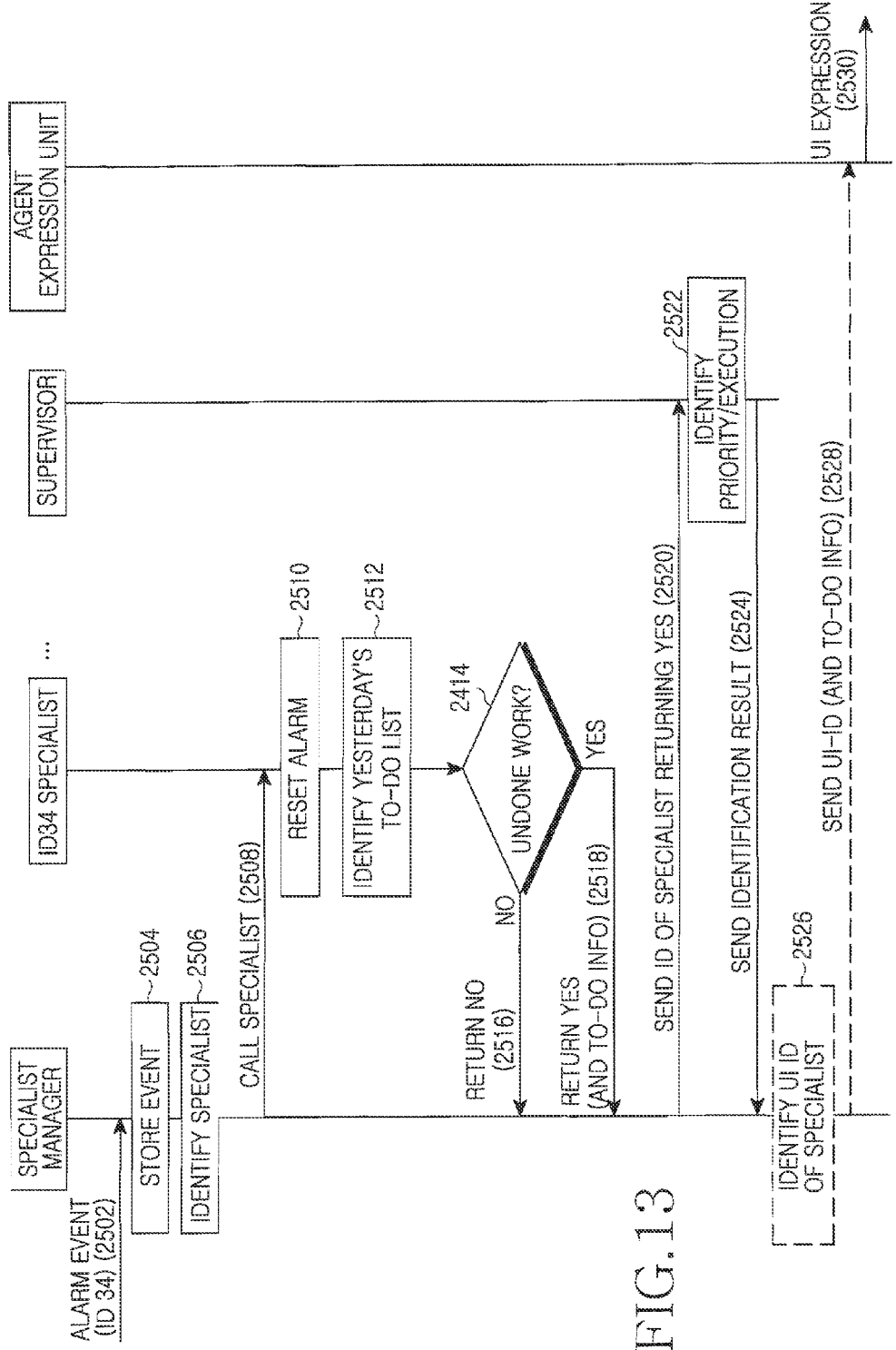
Figure 14:
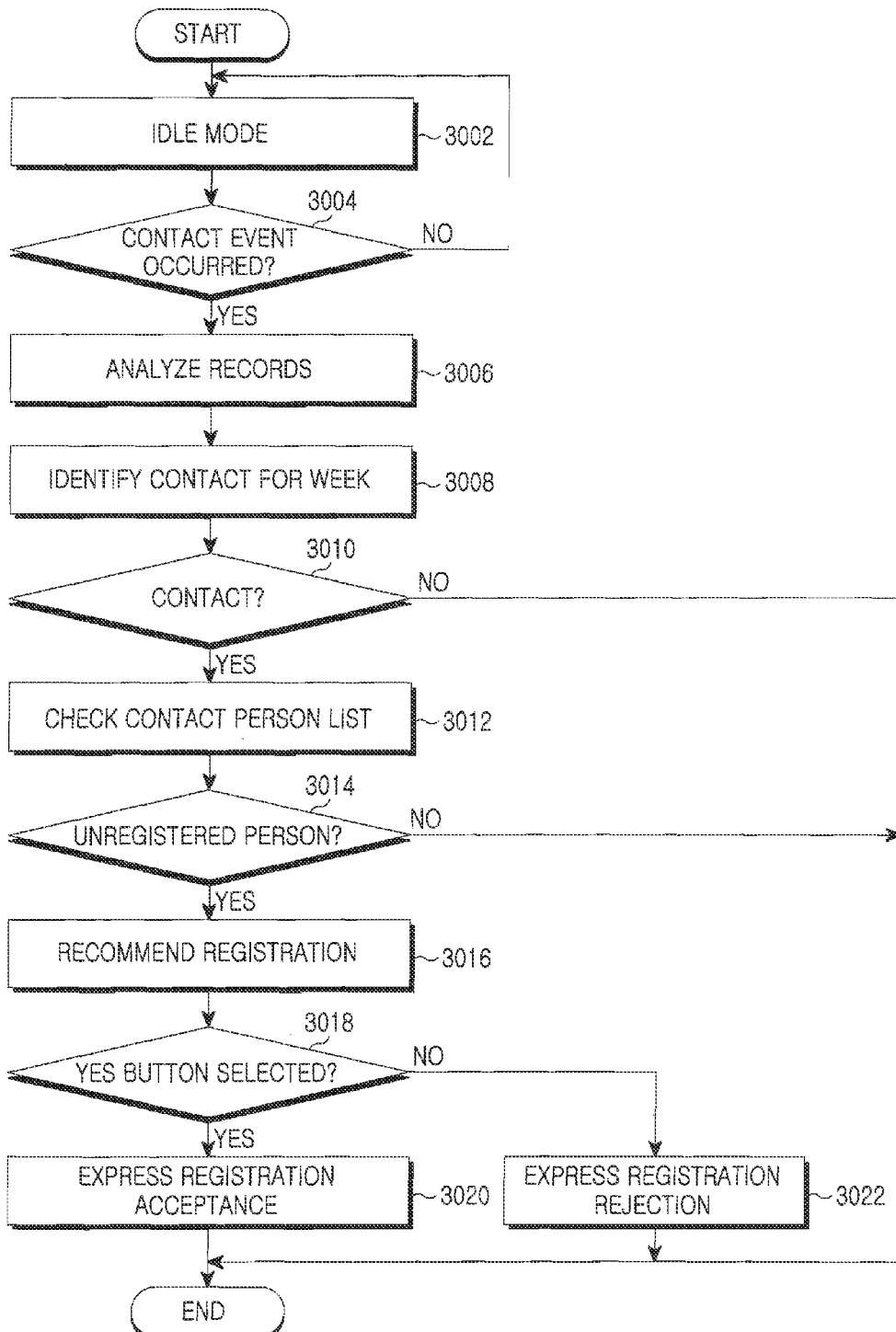
Figure 15:
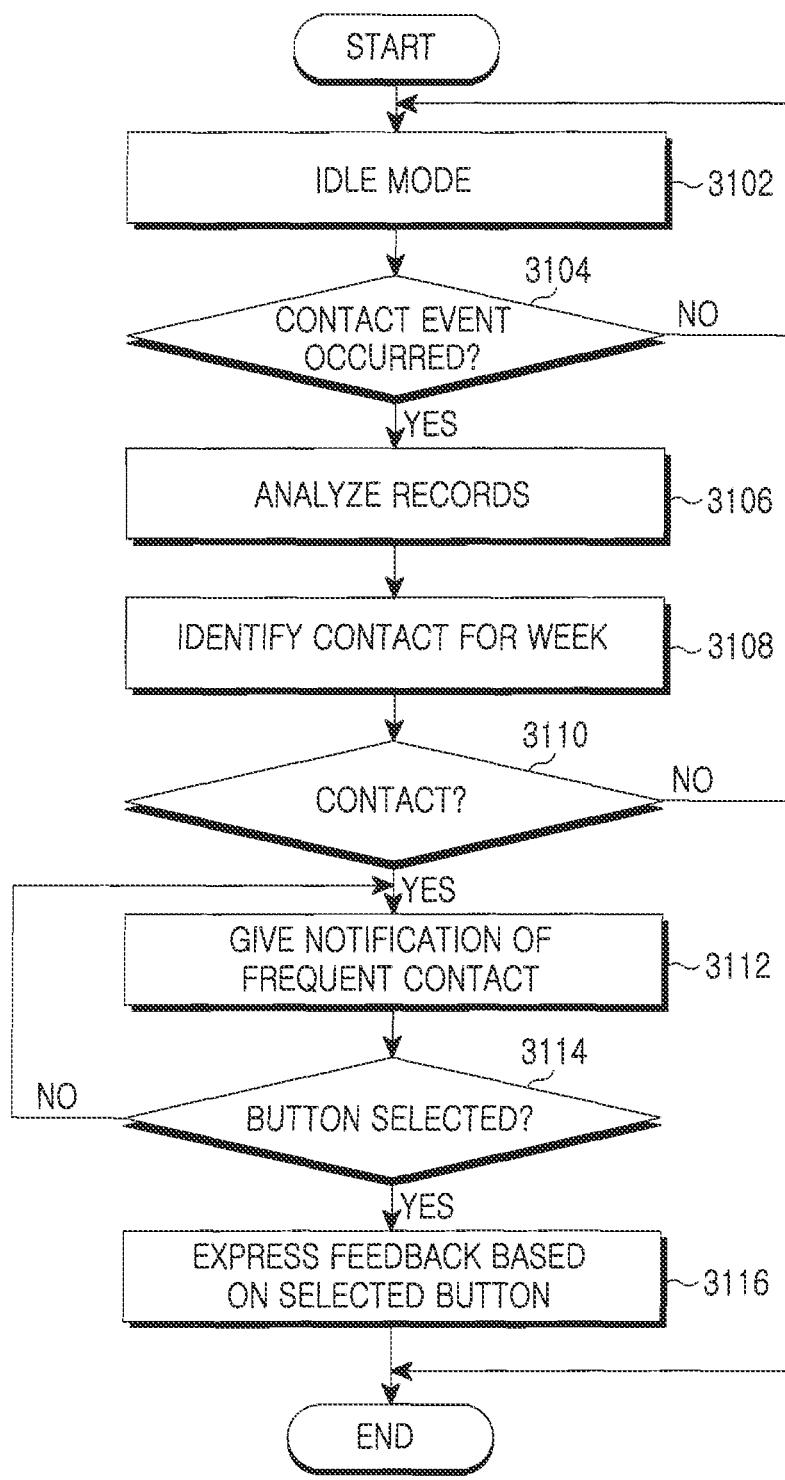
Figure 16:
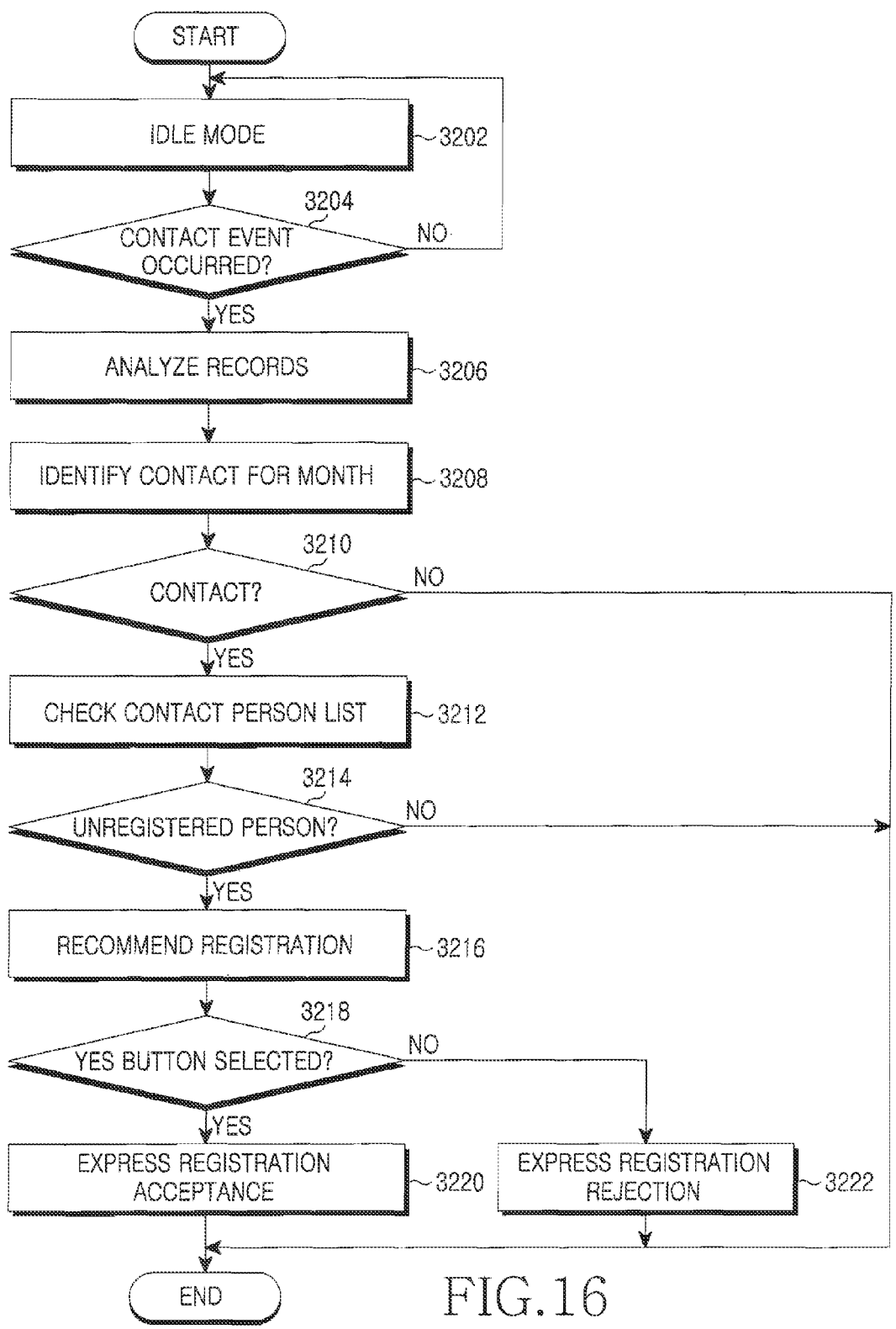
Figure 17:
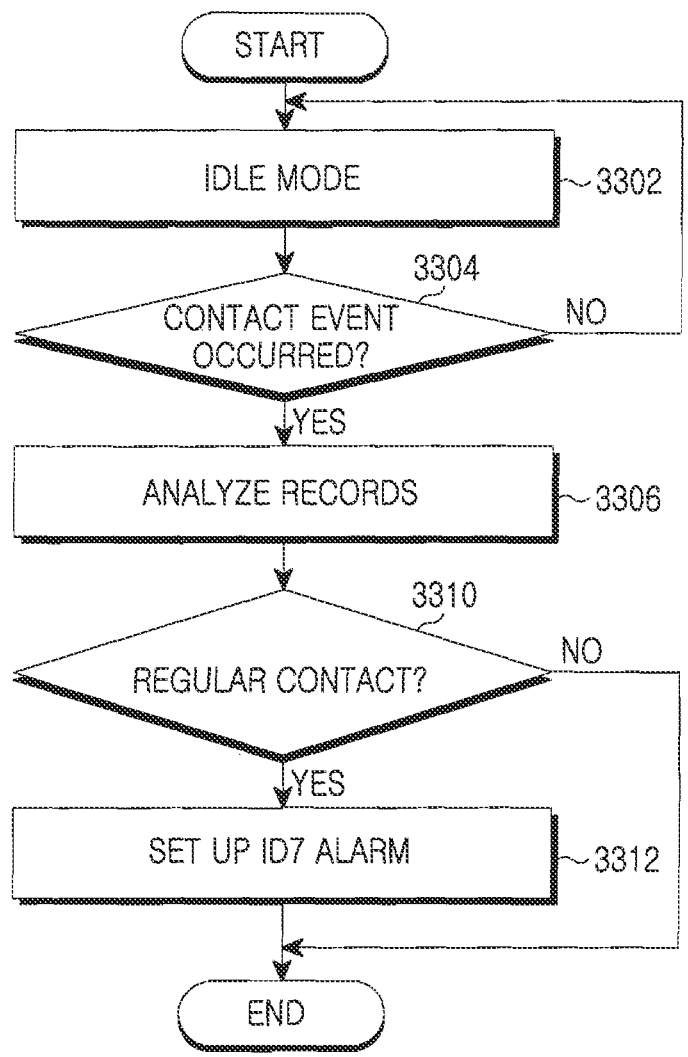
Figure 18:
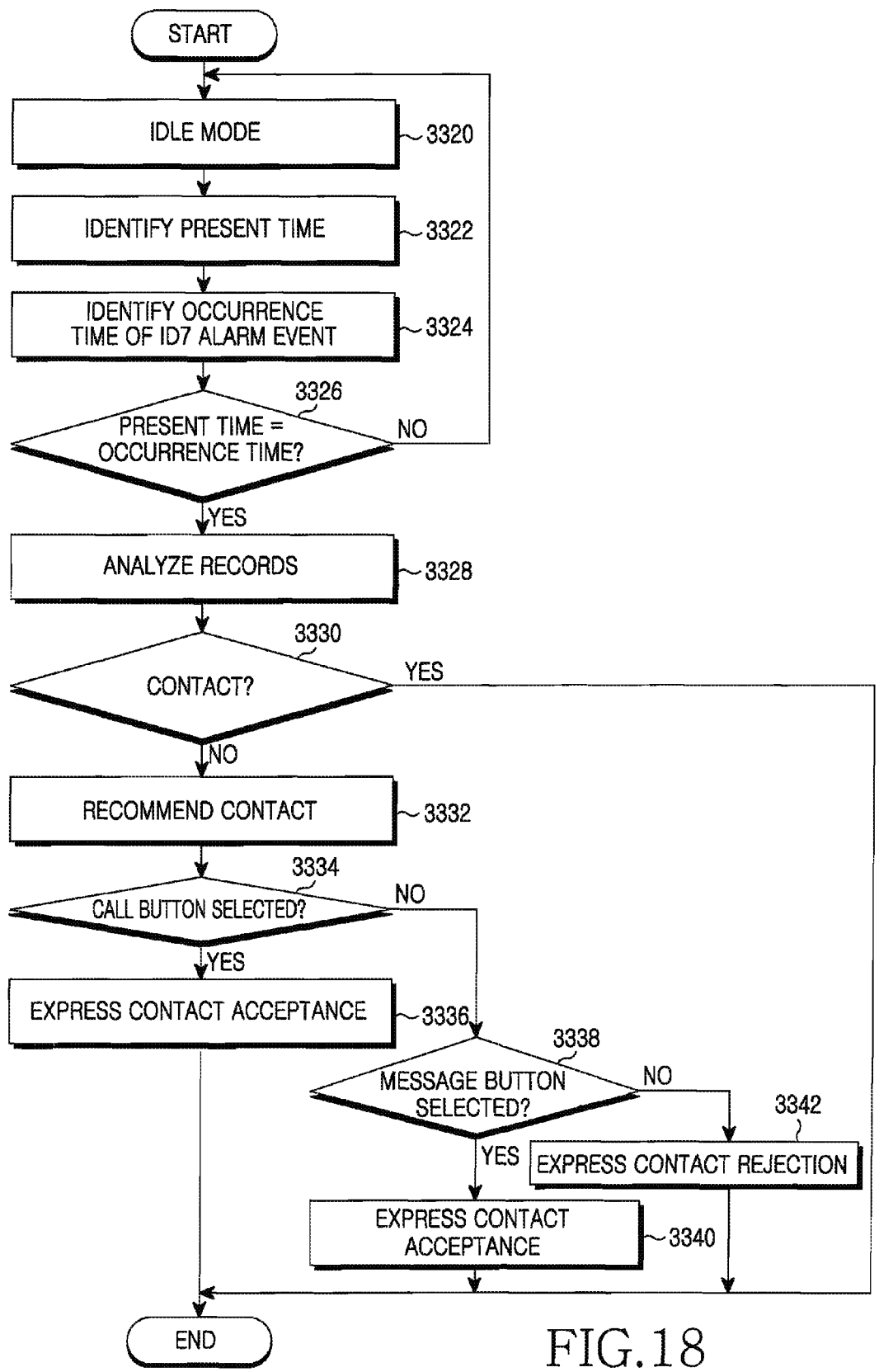
Figure 19:
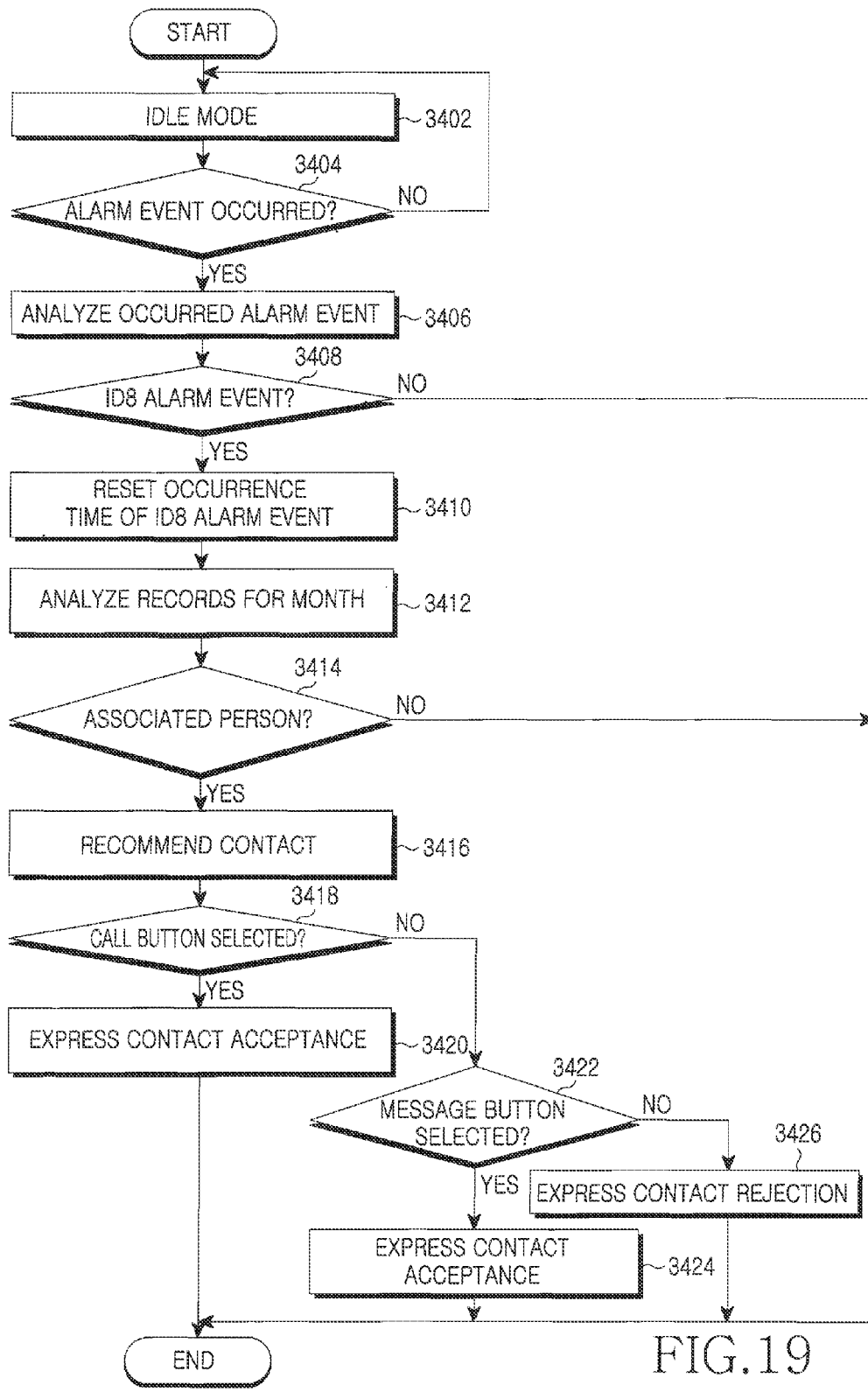
Figure 20:
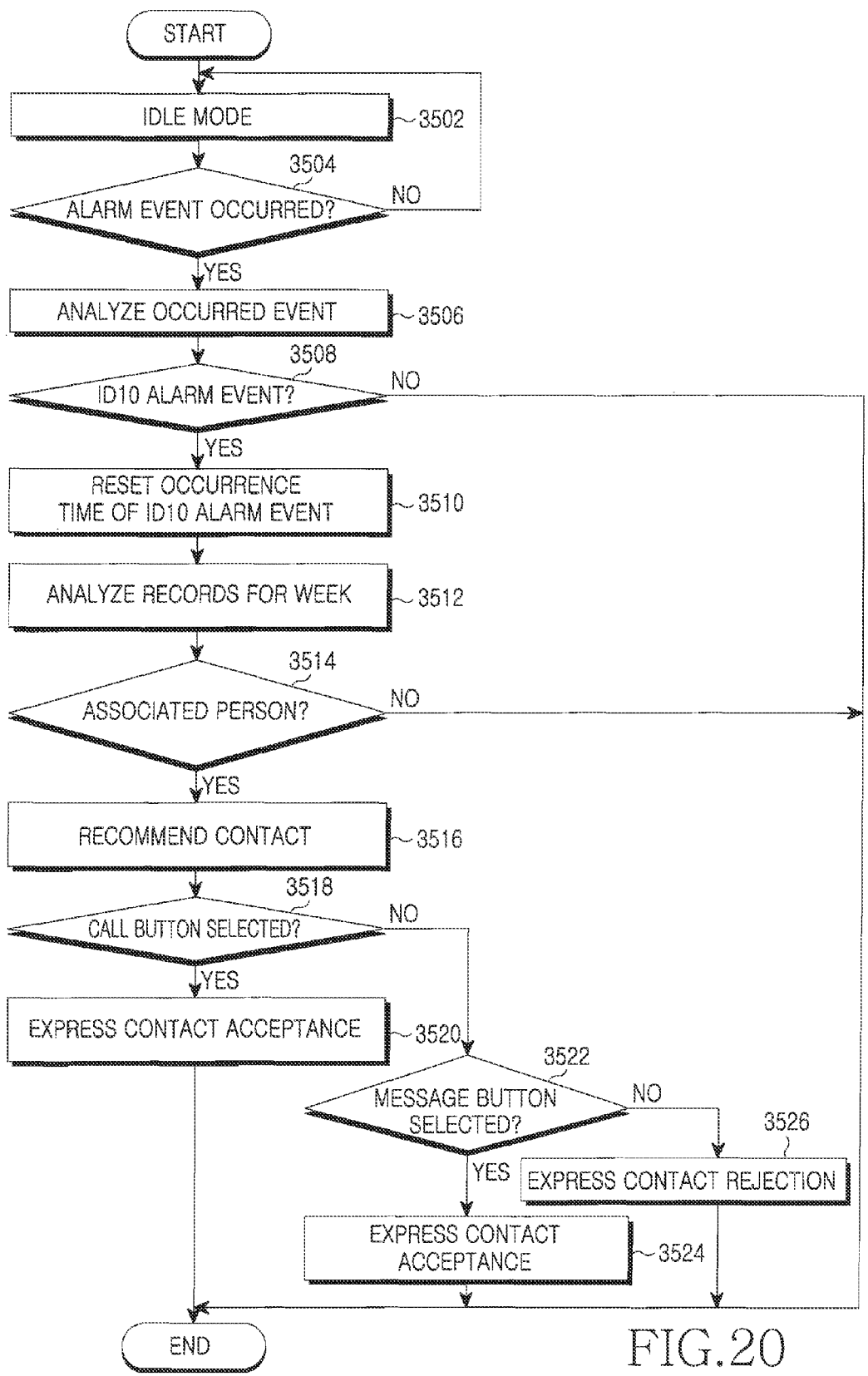
Figure 21:
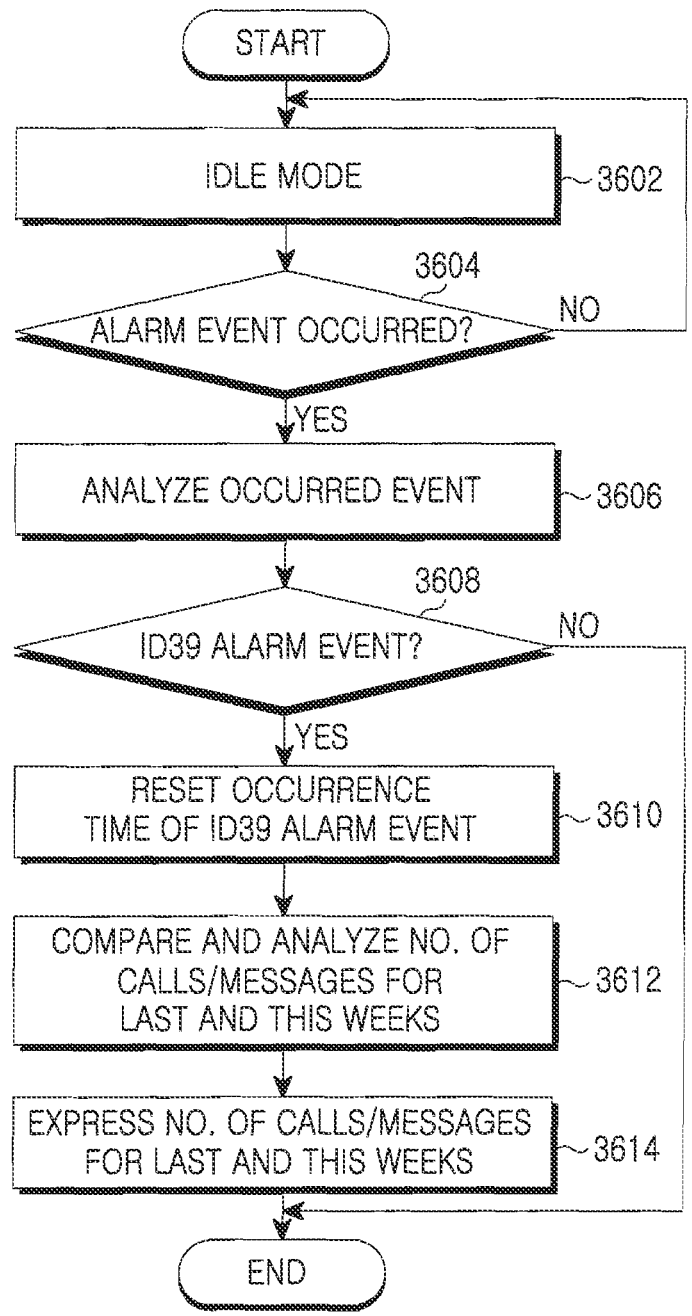
Figure 22:
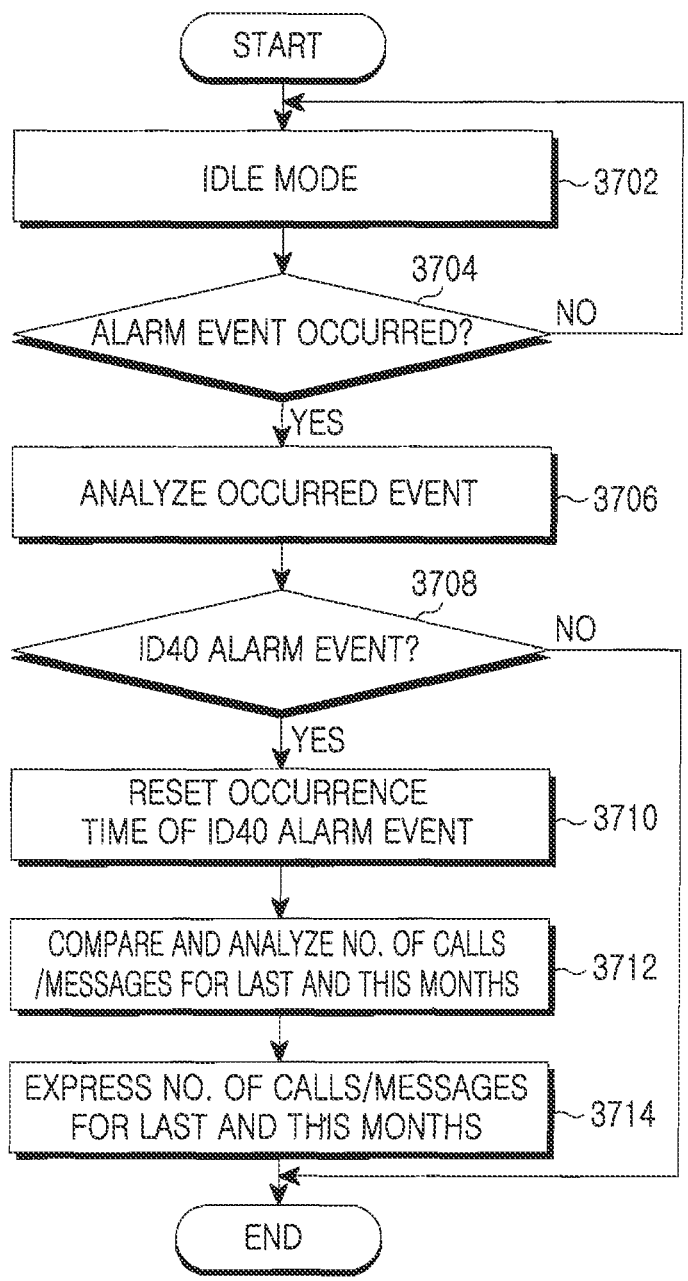
Figure 23:
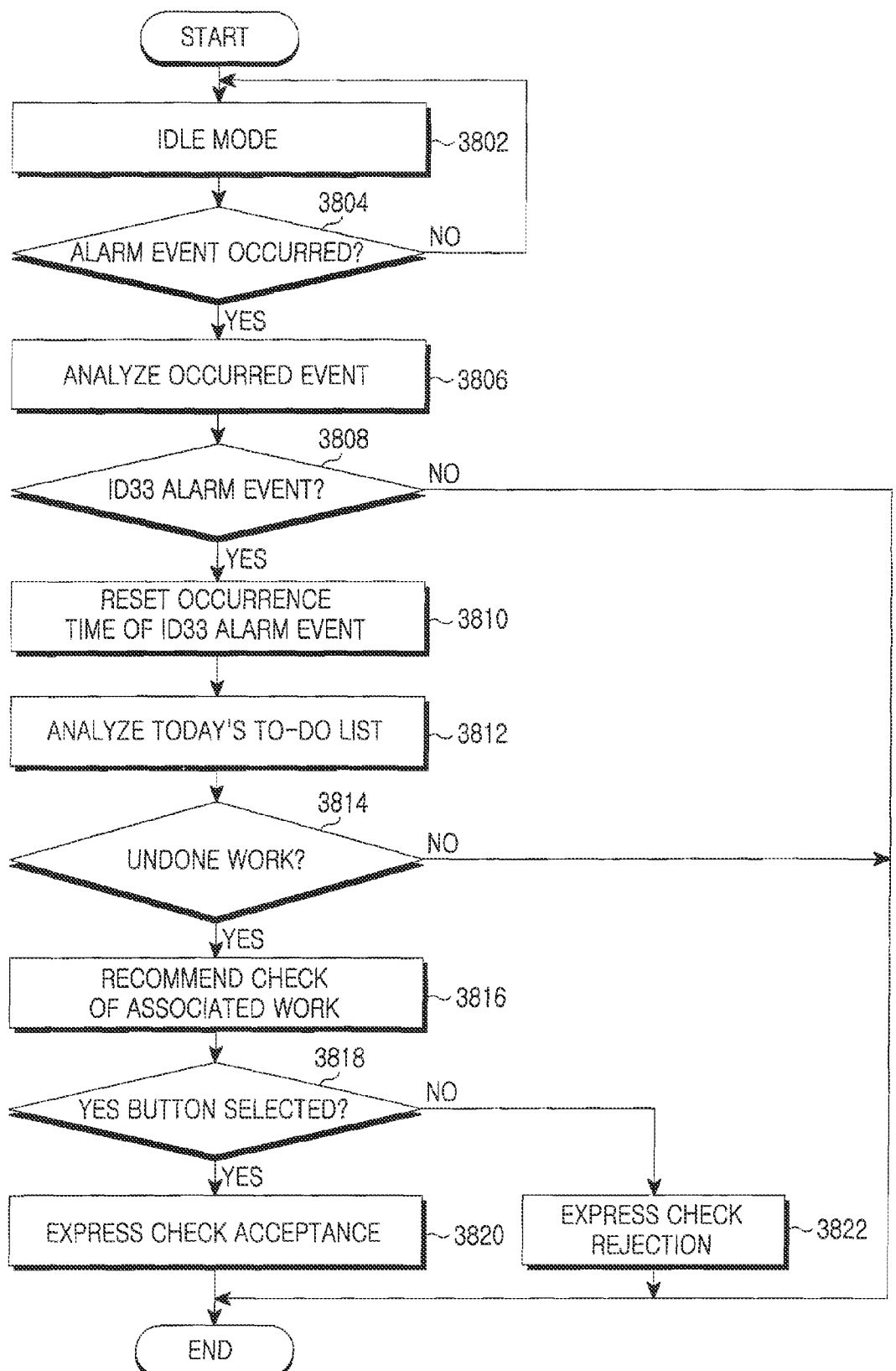
Figure 24:
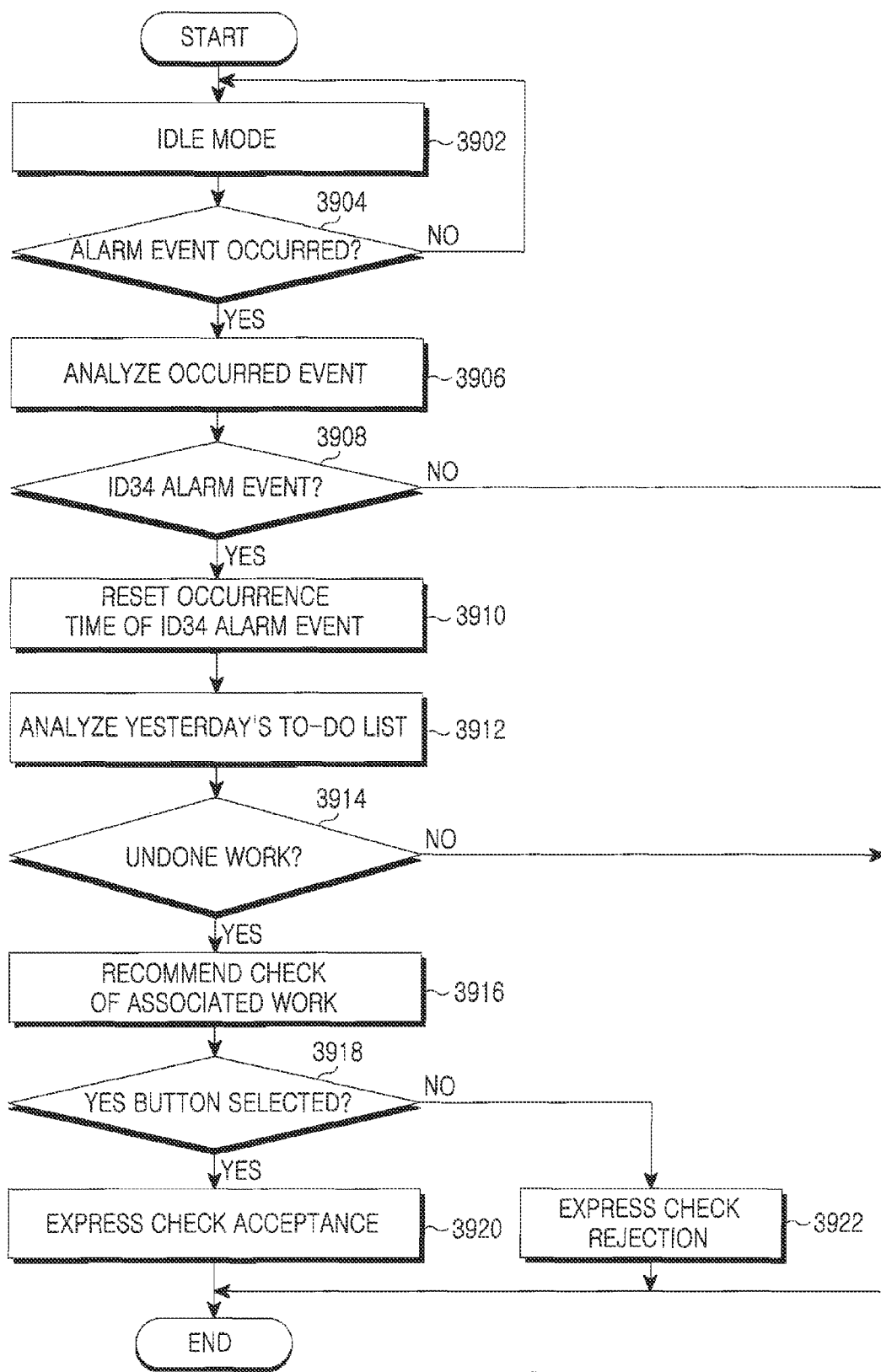
Figure 31:
Figure 32:
Figure 33A:
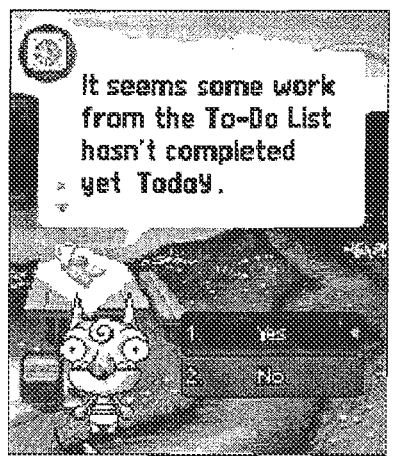
Figure 33B:
Figure 33C:
Figure 34A:
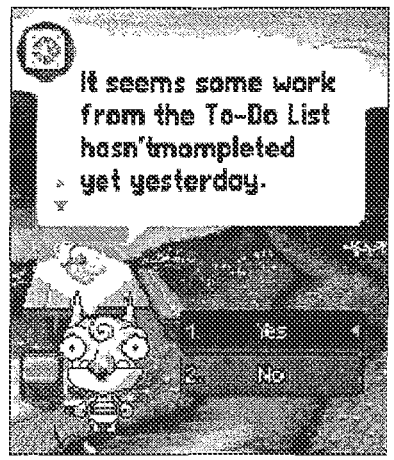
Figure 34B:
Figure 34C:

using a character agent in accordance with an exemplary embodiment of the present invention;

FIG. 4 is a flowchart illustrating an operation for notifying that a substantial number of a call/message-related contact has been made using a character agent in accordance with an exemplary embodiment of the present invention;

FIG. 5 is a flowchart illustrating an operation for setting up a relation to a contact person who has made continuous call/message-related contact (or registering the person in a specific group) using a character agent in accordance with an exemplary embodiment of the present invention;

FIG. 6 is a flowchart illustrating an operation for setting up an alarm for recommending contact with a specific person who has previously made regular contact but has not recently made contact using a character agent in accordance with an exemplary embodiment of the present invention;

FIG. 7 is a flowchart illustrating an operation for recommending contact with a specific person who has previously made regular contact but has not recently made contact using a character agent in accordance with an exemplary embodiment of the present invention;

FIG. 8 is a flowchart illustrating an operation for recommending contact with a specific person who has generally made little contact using a character agent in accordance with an exemplary embodiment of the present invention;

FIG. 9 is a flowchart illustrating an operation for recommending contact with a specific person of a specific group who has recently made little contact using a character agent in accordance with an exemplary embodiment of the present invention;

FIG. 10 is a flowchart illustrating an operation for giving notification of the number of calls/messages for this week using a character agent in accordance with an exemplary embodiment of the present invention;

FIG. 11 is a flowchart illustrating an operation for giving notification of the number of calls/messages for this month using a character agent in accordance with an exemplary embodiment of the present invention;

FIG. 12 is a flowchart illustrating an operation for giving notification indicating if some work on today's TO-DO list has been completed using a character agent in accordance with an exemplary embodiment of the present invention;

FIG. 13 is a flowchart illustrating an operation for giving notification indicating if some work on yesterday's TO-DO list has been completed using a character agent in accordance with an exemplary embodiment of the present invention;

FIG. 14 is a flowchart illustrating an operation for setting up a relation to a contact person who has made call/message-related contact (or registering the person in a specific group) in the wireless terminal in accordance with an exemplary embodiment of the present invention;

FIG. 15 is a flowchart illustrating an operation for notifying that a substantial number of a call/message-related contact has been made in the wireless terminal in accordance with an exemplary embodiment of the present invention;

FIG. 16 is a flowchart illustrating an operation for setting up a relation to a contact person who has made continuous call/message-related contact (or registering the person in a specific group) in the wireless terminal in accordance with an exemplary embodiment of the present invention;

FIG. 17 is a flowchart illustrating an operation for setting up an alarm for recommending contact with a specific person who has previously made regular contact but has not recently made contact in the wireless terminal in accordance with an exemplary embodiment of the present invention;

FIG. 18 is a flowchart illustrating an operation for recommending contact with a specific person who has previously made regular contact but has not recently made contact in the wireless terminal in accordance with an exemplary embodiment of the present invention;

FIG. 19 is a flowchart illustrating an operation for recommending contact with a specific person who has generally made little contact in the wireless terminal in accordance with an exemplary embodiment of the present invention;

FIG. 20 is a flowchart illustrating an operation for recommending contact with a specific person of a specific group who has recently made little contact in the wireless terminal in accordance with an exemplary embodiment of the present invention;

FIG. 21 is a flowchart illustrating an operation for giving notification of the number of calls/messages for this week in the wireless terminal in accordance with an exemplary embodiment of the present invention;

FIG. 22 is a flowchart illustrating an operation for giving notification of the number of calls/messages for this month in the wireless terminal in accordance with an exemplary embodiment of the present invention;

FIG. 23 is a flowchart illustrating an operation for giving notification indicating if some work on today's TO-DO list has been completed in the wireless terminal in accordance with an exemplary embodiment of the present invention;

FIG. 24 is a flowchart illustrating an operation for giving notification indicating if some work on yesterday's TO-DO list has been completed in the wireless terminal in accordance with an exemplary embodiment of the present invention;

FIGS. 25A-25D illustrates exemplary screens in an operation for recommending the setup of a relation to a specific person who has recently made much contact in accordance with an exemplary embodiment of the present invention;

FIGS. 26A-26D illustrates exemplary screens in an operation for notifying that a substantial number of a call/message-related contact with a specific person has been recently made in accordance with an exemplary embodiment of the present invention;

FIGS. 27A-27D illustrates exemplary screens in an operation for recommending the setup of a relation to a specific person who has made continuous contact in accordance with an exemplary embodiment of the present invention;

FIGS. 28A-28D illustrates exemplary screens in an operation for recommending contact with a specific person who has previously made regular contact but has not recently made contact in accordance with an exemplary embodiment of the present invention;

FIGS. 29A-29D illustrates exemplary screens in an operation for recommending contact with a specific person who has generally made little contact in accordance with an exemplary embodiment of the present invention;

FIGS. 30A-30D illustrates exemplary screens in an operation for recommending contact with a specific person of a specific group who has recently made little contact in accordance with an exemplary embodiment of the present invention;

FIG. 31 illustrates exemplary screens in an operation for giving notification of the number of calls/messages for this week in accordance with an exemplary embodiment of the present invention;

FIG. 32 illustrates exemplary screens in an operation for giving notification of the number of calls/messages for this month in accordance with an exemplary embodiment of the present invention;

FIGS. 33A-33C illustrates exemplary screens in an operation for giving notification indicating if some work on today's TO-DO list has been completed in accordance with an exemplary embodiment of the present invention; and FIGS. 34A-34C illustrates exemplary screens in an operation for giving notification indicating if some work on yesterday's TO-DO list has been completed in accordance with an exemplary embodiment of the present invention.

Throughout the drawings, the same drawing reference numerals will be understood to refer to the same elements, features, and structures.

DETAILED DESCRIPTION OF THE PREFERRED EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. In the following description, specific details, such as types of events and information necessary for agent expression are provided for a better understanding of the present invention. An alarm event may be a timer event. The timer event occurs when a set occurrence time is reached. Hereinafter, an alarm and an alarm event may be used in the same meaning.

Figure 1:
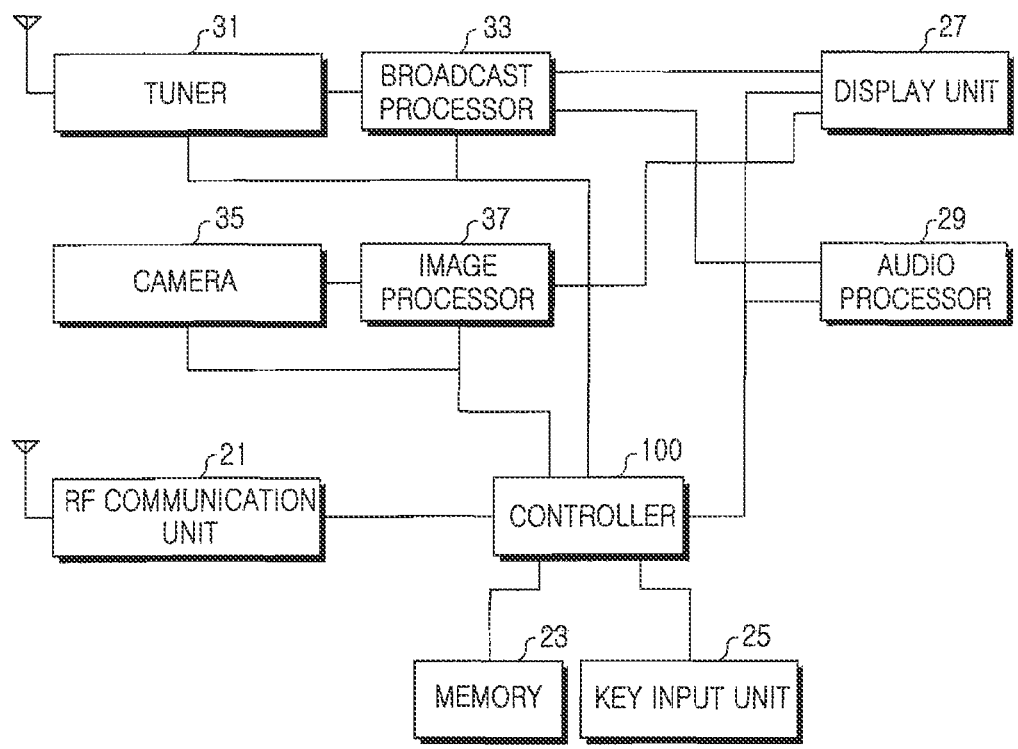
FIG. 1 is a block diagram illustrating a structure of a wireless terminal in accordance with an exemplary embodiment of the present invention.

FIG. 1 is a block diagram illustrating a structure of a wireless terminal for expressing a character agent according to an event occurring therein in accordance with an exemplary embodiment of the present invention. Referring to FIG. 1, a radio frequency (RF) communication unit 21 performs a wireless communication function of the wireless terminal. The RF communication unit 21 includes an RF transmitter for up converting and amplifying a frequency of a signal to be transmitted, and RF receiver for low noise amplifying a received signal and down converting a frequency of the received signal. A key input unit 25 is provided with keys for inputting number and letter information and function keys for setting various functions. Moreover, the key input unit 25 is provided with keys for controlling a character agent on an event-by-event basis in accordance with an exemplary embodiment of the present invention.

A memory 23 can be configured by program and data memories. The program memory stores programs for processing a call of the wireless terminal and for controlling agent expression for events occurring in accordance with an exemplary embodiment of the present invention. The data memory temporarily stores data generated in operation. Moreover, the data memory is provided with a character memory for storing character images for agent expression in accordance with an exemplary embodiment of the present invention. The character memory can operate with a file system, and can have an index of a character-by-character memory (or file system). The character memory can be configured in various forms for enabling operations, facial expressions, and object representations of character components. Character information can be stored in the character memory according to an agent expression form. A text memory for storing text for agent expression is provided. The text memory can store associated content according to an occurred event or feedback. Registered TO-DO information, phone number (phone book) list information, and occurred events are stored on a type-by-type basis.

The controller 100 performs a function for controlling the overall operation of the wireless terminal. Moreover, the controller 100 is provided with a modulator-demodulator (MODEM) for modulating/demodulating a signal and a coder-decoder (CODEC) for coding/decoding a signal. As a result, the controller 100 performs a function for coding and modulating a signal to be transmitted and a function for demodulating and decoding a received signal. Here, the controller 100 may be a mobile station modem (MSM) chip. The controller 100 controls operations of communication mode, camera mode, and broadcasting reception mode in response to mode selected by a user. A data processor is independently configured to separate the MODEM and CODEC from the controller 100. The data processor can be placed between the RF communicator 21 and the controller 100. In accordance with an exemplary embodiment of the present invention, the controller 100 collects an event according to the operation of the wireless terminal, controls an agent according to the collected event, and expresses a result of processing and state of the event using an agent. Here, the agent expression can be displayed after an associated character and text are selected from the memory 23. An associated character and text can be displayed according to a feedback.

At the time of the user's camera mode selection, a camera 35 is started by the controller 100 and generates an image capture signal in the camera mode. An image processor 37 scales the image capture signal from the camera 35 according to a size of a display unit 27 in the camera mode, and encodes and stores the image capture signal in a storage mode according to a set scheme. In a mode for reproducing received or stored image data, the image processor 37 performs a function for decoding encoded image data.

In the broadcasting reception mode, a tuner 31 selects and receives a broadcast signal of a channel set under control of the controller 100. A broadcast processor 33 demodulates and decodes the broadcast signal of the selected channel, and outputs the demodulated and decoded image signal to the display unit 27. An audio signal is output to an audio processor 29. Here, the broadcast signal may be a satellite broadcast signal or a terrestrial broadcast signal.

Under the control of the controller 100, the display unit 27 can display menus according to the operation of the wireless terminal. When an event occurs, the display unit 27 displays an output character mapped to the event. Moreover, the display unit 27 displays an image signal output from the image processor 37 or the broadcast processor 33 in the camera mode or broadcasting reception mode.

Under the control of the controller 100, the audio processor 29 processes an audio signal generated in the communication mode. Under the control of the image processor 37, the audio processor 29 processes an audio signal generated during an image capture operation in the camera mode. The audio processor 29 processes a broadcast audio signal received under the control of the broadcast processor 33 in the broadcasting reception mode.

A structure for processing the camera signal and/or broadcast signal can be omitted from the wireless terminal with the above-described structure. In this case, a character agent function for an event can be performed in accordance with an exemplary embodiment of the present invention. In the following description, it is assumed that the character is an avatar. Accordingly, character agent control for an event of the wireless terminal will be described as avatar agent control, but can be equally applied for all images as well as the avatar.

Figure 2:
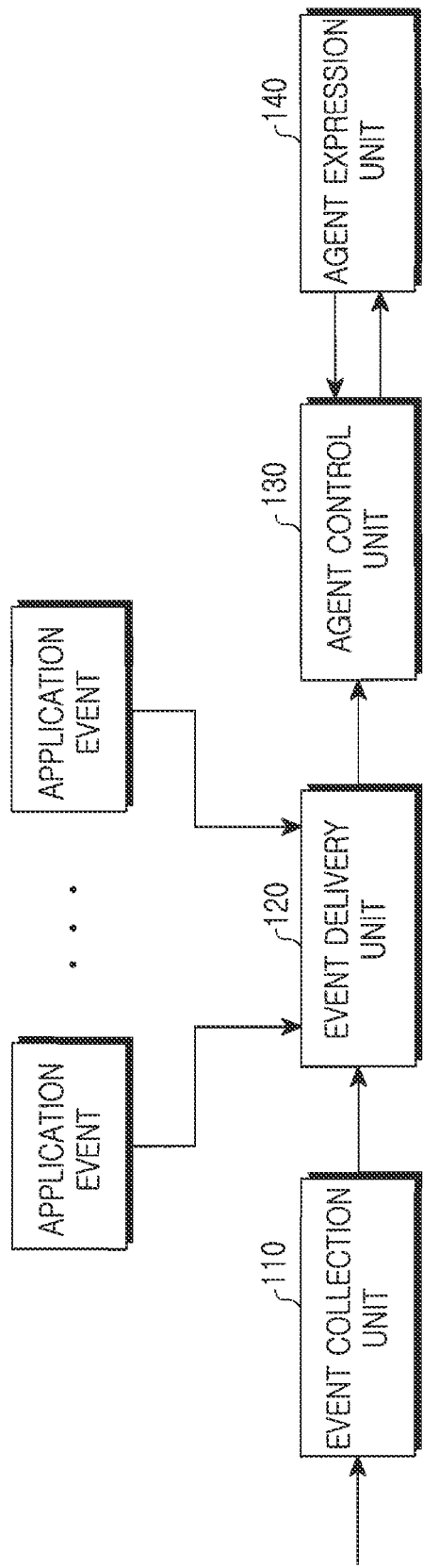
FIG. 2 is a functional block diagram illustrating a controller of the wireless terminal in accordance with an exemplary embodiment of the present invention.

FIG. 2 is a functional block diagram illustrating a controller of the wireless terminal in accordance with an exemplary embodiment of the present invention. An example of the functional block configuration as illustrated in FIG. 2 is disclosed in Korean Patent Application Serial No. 2004-78470, entitled "Intelligent Terminal Using an Artificial Intelligence Agent", filed by Kim Jaeho, et al. The following description will be given with reference to content disclosed in Korean Patent Application Serial No. 2004-78470. To implement the present invention, the controller 100 may control a single agent system without functional blocks such as an event collection unit, event delivery unit, agent control unit, and agent expression unit.

Referring to FIG. 2, the event collection unit 110 performs a function for collecting events occurring in the wireless terminal. Here, the events include all events of the wireless terminal such as a communication event of the wireless terminal, event occurring in the wireless terminal itself, event occurring according to the user's request, and event occurring when a multimedia function of the wireless terminal is performed. That is, the events collected by the event collection unit 110 are events defined in the wireless terminal. The event collection unit 110 generates an event message for identifying an occurred event, and provides the event message to the event delivery unit 120.

The event delivery unit 120 performs a function for delivering the event message received from the event collection unit 110 to an associated client. In accordance with an exemplary embodiment of the present invention, it is assumed that the event delivery unit 120 delivers the event message only to the agent control unit 130. When a different component makes an event message delivery request, the event message can be delivered to the different component. Moreover, the event delivery unit 120 receives user-defined events undefined in the wireless terminal as well as the events received from the event collector 100 and delivers the received events to the agent control unit 130. Here, the user-defined events as described above are referred to as application events. The application events may occur in games, other application programs, and web service programs.

When receiving an event message from the event delivery unit 120, the agent control unit 130 stores the received event message in an internal buffer, and analyzes the event message to set a user interface (UI) such that an associated character agent can be expressed. Here, the event delivered from the event delivery unit 120 may be events of the wireless terminal (for example, events received from the event collection unit 110) and application events. In the following, a description is focused on the agent expression for an event received from the event collection unit 110. The agent control unit 130 is provided with a plurality of specialists. The agent control unit 130 controls these specialists, selects a specialist mapped to an occurred event, and performs an agent control function.

When an event is received, the agent control unit 130 notifies suitable specialists of event occurrence according to the received event, and sends a UI request to the agent expression unit 140 such that agent expression of the finally selected specialist can be displayed. In response to feedback information of the user received from the agent expression unit 140, the user feedback information for an associated event is processed.

The agent expression unit 140 displays the character expression for an associated event according to agent UI information output from the agent control unit 130. At this time, the agent expression unit 140 manages a plurality of avatar UIs to be displayed on the display unit 27. The agent control unit 130 performs a control operation such that an avatar mapped to requested UI information can be displayed. When the user generates the feedback information in a state in which the avatar has been displayed according to the occurred event, the agent expression unit 140 sends the received feedback information to the agent control unit 130. The agent control unit 130 performs agent control according to the user feedback information received from the agent expression unit 140.

When only the events of the wireless terminal collected by the event collection unit 110 are processed in the structure of FIG. 2, the event delivery unit 120 can be omitted. Here, the internal buffer of the agent control unit 130 is referred to as a blackboard.

Next, the structure and operation of the agent control unit 130 will be described in more detail. The agent control unit 130 includes a plurality of specialists for receiving a call according to an event type, performing a preset special task, and outputting a task result. A blackboard stores various information including information of event messages. A supervisor selects one specialist when a plurality of specialists output valid results. An avatar quotient memory stores an avatar quotient according to an occurred event. A specialist manager selects associated specialists from a list of event-by-event specialists at the time of event occurrence and controls an agent according to an event.

The specialists make a contribution to solving a problem and have specialty for defined parts. The specialists record a solution of an intermediate step in the blackboard and also express a priority and user preference for the solution of the intermediate step. The specialists identify a state of the blackboard, make a request for computing the priority and user preference, and record the solution of the intermediate step in the blackboard.

The blackboard is a working environment and information space for communication between the specialists. Basically, the specialists can record the solution of the intermediate step. Advantages of a pattern of the blackboard 330 are as follows. First, many specialists of different types can be easily integrated. Second, the specialists can be independently modularized and developed because the specialists seldom affect each other. Third, flexibility is provided for many variations, such as a change of a specialist algorithm or an addition of a new specialist.

When at least two specialists are selected in relation to one event, the specialist manager requests that the supervisor select a specialist most closely related to the received event. The supervisor analyzes data of the blackboard, a basically designated priority according to an event and user preference, thereby selecting the specialist with the closest relation.

An internal quotient of an avatar is varied according to an agent function and various events occurring in the wireless terminal and the feedback information of the user. Also, many application events capable of using the avatar quotient affect the avatar quotient. As the internal quotient is varied, an avatar interface is varied. As a period of time elapses, the appearance in which the avatar is brought up is viewed. This is a growth concept of the avatar. In accordance with an exemplary embodiment of the present invention, the avatar growth is introduced into the wireless terminal based on an artificial intelligence (AI) agent system. For this, the wireless terminal proposes and reports many actions to the user on the basis of various events occurring in the wireless terminal. Accordingly, the user can use the terminal more effectively and enjoyably. On the basis of these events and the user's feedback action, an avatar image and text are varied, and the avatar quotient is varied.

Table 1 shows concrete cases in accordance with an exemplary embodiment of the present invention. Table 1 shows event use cases, case classification, event determination times, action (processing) times of specialists, the number of occurrences, times, event parameters (necessary information), conditions, UI text, user options, and so on. Other cases can be added to the above cases or some cases can be deleted.

TABLE 1

| ID | Use Case | Class | Info necessary for controller | UI Text | Option |
|----|----------|-------|-------------------------------|---------|--------|
| 4 | Make the praise and recommend relation setup when the number of calls/messages for contact with a specific person is large. | CALL/MESSAGE | AP_PHONE_ANSWER/ AP_PHONE_SEND/ AP_SMS_SEND/ AP_SMS_READ/ ContactID/Number | You have made much contact with [Name]. Would you like to set up a relation? | Yes/No |
| 5 | Make the praise when the number of calls/messages for contact with a specific person is large. | CALL/MESSAGE | AP_PHONE_ANSWER/ AP_PHONE_SEND/ AP_SMS_SEND/ AP_SMS_READ/ ContactID/Number | You have recently made much contact with [Name]. It seems that you have a special relation to [Name]. | Yes/ Really?/ Cut it off! |
| 6 | Recommend relation setup for a number when regular contact has been made but relation to the number is not set up. | CALL/MESSAGE | AP_PHONE_ANSWER/ AP_PHONE_SEND/ AP_SMS_SEND/ AP_SMS_READ/ ContactID/Number | A relation to [Name] is not set up. Would you like to set up a relation to [Name] at this time? | Yes/No |
| 7 | Identify a contact person who has recently made little contact and recommend call (or message)-related contact. | CALL/MESSAGE | AP_PHONE_ANSWER/ AP_PHONE_SEND/ AP_SMS_SEND/ AP_SMS_READ/ ContactID/Number | You have recently made little contact with [Name]. Would you like to call [Name] for greeting? | Call/Message/No |
| 8 | Identify a contact person who has generally made little contact and recommend call (or message)-related contact. | CALL/MESSAGE | AP_PHONE_ANSWER/ AP_PHONE_SEND/ AP_SMS_SEND/ AP_SMS_READ/ ContactID/Number | You have made little contact with [Name]. Would you like to call [Name]? | Call/Message/No |
| 10 | Recommend (call or message-related) contact with a contact person of a group who has not made contact for a long time. | CALL/MESSAGE | AP_PHONE_ANSWER/ AP_PHONE_SEND/ AP_SMS_SEND/ AP_SMS_READ/ ContactID/Number | You have not made contact with [Name] of [Group]. Would you like to call [Name]? | Call/Message/No |
| 39 | Show a call duration time and the number of messages for this week on Saturday, compare information of this week with that of last week, and show an increased/decreased number of calls (pattern analysis). | CALL/MESSAGE | | (The number of calls and the number of messages are shown.) The number of calls/messages has been increased/decreased for this week as compared with last week. | OK |
| 40 | Show a call duration time and the number of messages for this week at the end of the month, and show the increased/decreased number of calls as compared with that of last week. | CALL/MESSAGE | | (The number of calls and the number of messages are shown.) The number of calls/messages has been increased/decreased for this month as compared with last month. | OK |
| 33 | Ask if some work on the TO-DO list has been completed at night when it is still undone. | TO-DO | | Some work on the TO-DO list has not been completed. Would you like to check it? | Yes/No |

TABLE 1-continued

| ID | Use Case | Class | Info necessary for controller | UI Text | Option |
|----|----------|-------|-------------------------------|---------|--------|
| 34 | Ask if some work on the TO-DO list has been completed when it is still undone at morning. | TO-DO | | There remains some work that should be done yesterday. Would you like to check it? | Yes/No |

An operation for processing call and message-related contact events in a wireless terminal in accordance with features of the present invention will be described. The contact events to be described below indicate outgoing call (or phone call) transmission and/or incoming call (or phone call) reception, and message transmission and/or message reception.

Figure 3:
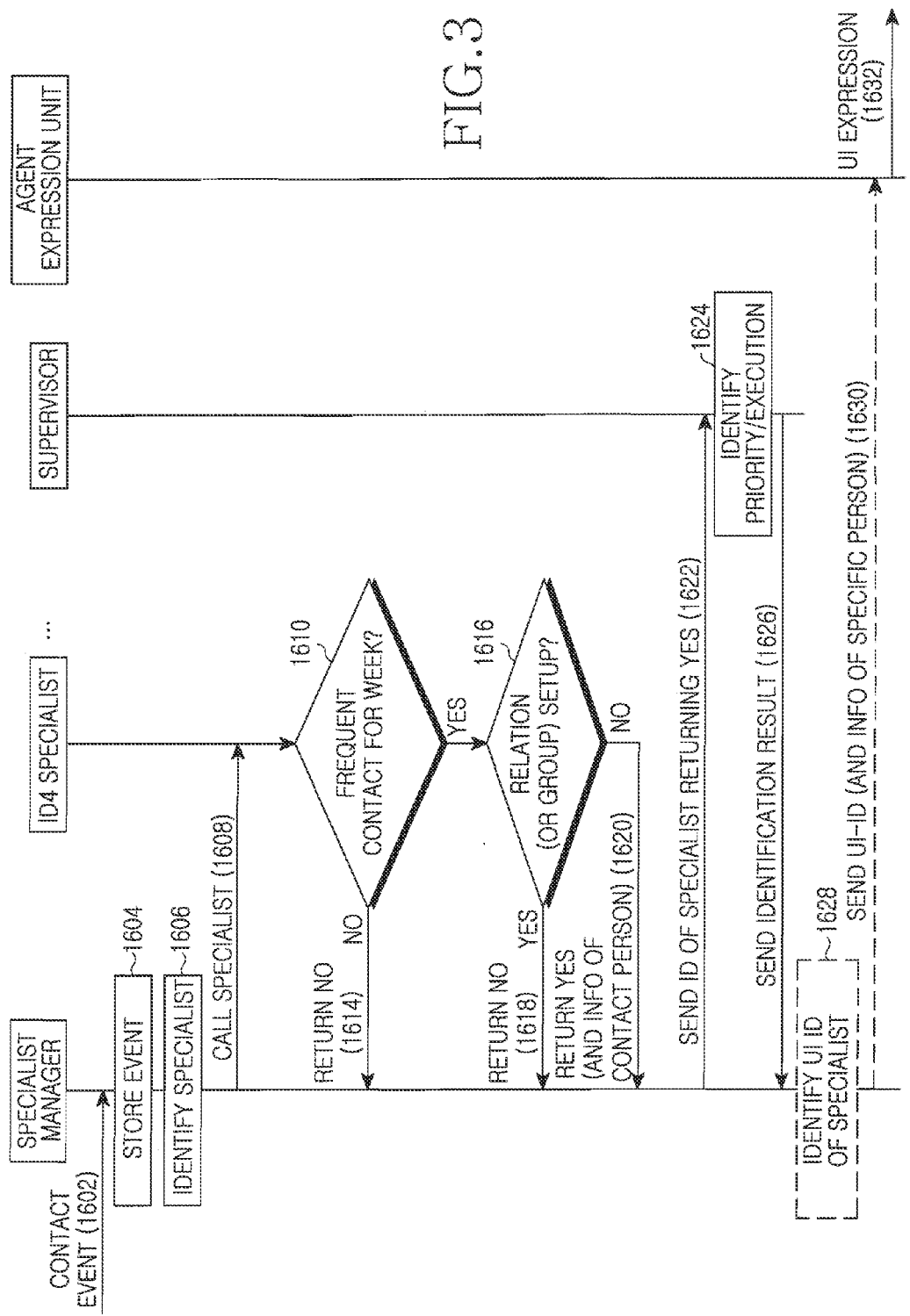
FIG. 3 is a flowchart illustrating an operation for setting up a relation to a contact person who has made call/message-related contact (or registering the person in a specific group)

FIG. 3 is a flowchart illustrating an operation for setting up a relation to a contact person who has made a call/message-related contact (or registering the person in a specific group) using a character agent in accordance with an exemplary embodiment of the present invention.

Referring to FIG. 3, an event collection unit (not illustrated) collects a call (or phone call) and message-related contact events when the call (or phone call) and message-related contact events occur. The call (or phone call) and message-related contact events may be phone call termination events, incoming phone call reception events, outgoing phone call transmission events, message reception events, and/or message transmission events. Then, the call (or phone call) and message-related contact events are provided to an event delivery unit (not illustrated). The event delivery unit (not illustrated) provides the events to a specialist manager of an agent control unit in step 1602. The specialist manager stores the call (or phone call) and message-related contact events in a blackboard in step 1604. Then, the specialist manager identifies specialists to be called from an internal specialist list when the call (or phone call) and message-related contact events occur in step 1606. Then, the specialist manager calls the specialists in step 1608. (FIG. 3 illustrates an example in which a specialist of Identifier (ID) 4 is called.)

Among the called specialists, the specialist of ID 4 is provided to recommend relation setup (or group registration) when a contact person has recently made frequent contact, but a relation to the contact person (or his/her phone number) has not been set up or has not been registered in a specific group. In step 1610, call (or phone call) and/or message-related contact records for one recent week are analyzed. Then, a determination is made as to whether a frequent call (or phone call) and/or message-related contact with the contact person (or his/her phone number) has been made at least a threshold number of times (for example, at least three times) for a predetermined period (for example, one recent week). If frequent contact with an associated contact person has not been made, the operation proceeds to step 1614 to return the 'NO' signal to the specialist manager. However, if frequent contact with the associated contact person has been made, the operation proceeds to step 1616. In step 1616, a determination is made as to whether a relation to the contact person (or his/her phone number) has been set up (or the contact person (or his/her phone number) has been registered in a specific group). If the relation setup (or group registration) has been made, the operation proceeds to step 1618 to return the 'NO' signal to the specialist manager. However, if a relation to the contact person (or his/her phone number) has not been set up or has not been registered in a specific group, the operation proceeds to step 1620 to return the 'YES' signal to the specialist manager.

When a called specialist makes the return, the specialist manager provides a supervisor with an ID of the specialist returning the 'YES' signal (for example, Specialist ID 4 of FIG. 3) in step 1622. Then, the supervisor identifies priorities of associated specialists or identifies the execution of an associated specialist when the number of specialists returning 'YES' is one in step 1624. In step 1626, the supervisor sends, to the specialist manager, a result of the identification for the highest priority specialist or the execution of the associated specialist. Then, the specialist manager identifies a UI ID of the highest priority specialist or the specialist to be executed in step 1628 and sends the identified UI ID to an agent expression unit in step 1630. In step 1632, the agent expression unit expresses an associated UI. When the specialist manager sends the UI ID to the agent expression unit, information of an associated contact person can also be sent.

Figure 25A:
Figure 25B:
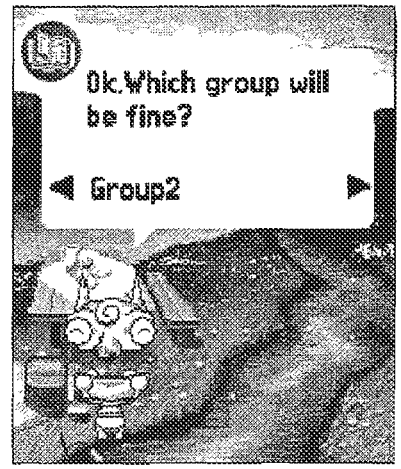
Figure 25C:
Figure 25D:

When this agent expression unit expresses a UI, for example, a UI mapped to Specialist ID 4, text for recommending the setup of a relation (or group) for an associated contact person (or his/her phone number) of a call (or phone call) and/or message can be included and expressed as illustrated in FIG. 25A. When an image and text for setting a character with a happy expression and/or a relation (or group) type are expressed and the relation (or group) is set according to the user's feedback as illustrated in FIG. 25B, a character with a happy expression and/or text indicating that the associated contact person (or his/her phone number) will be registered are expressed as illustrated in FIG. 25C or a character with a sad expression and/or text indicating that the associated contact person (or his/her phone number) will not be registered are expressed as illustrated in FIG. 25D. When a predetermined time elapses or a predetermined key is input, the expressed character and/or text disappear. The information of the contact person includes a phone number and ID of the contact person who has made the call and/or message-related contact.

FIG. 4 is a flowchart illustrating an operation for notifying a substantial number of a call/message-related contact that has been made using a character agent in accordance with an exemplary embodiment of the present invention.

Referring to FIG. 4, an event collection unit (not illustrated) collects a call (or phone call) and message-related contact events when the call (or phone call) and message-related contact events occur. The call (or phone call) and message-related contact events may be phone call termination events, incoming phone call reception events, outgoing phone call transmission events, message reception events, and/or message transmission events. Then, the call (or phone call) and message-related contact events are provided to an event delivery unit (not illustrated). The event delivery unit (not illustrated) provides the events to a specialist manager of an agent control unit in step 1702. The specialist manager stores the call (or phone call) and message-related contact events in a blackboard in step 1704. Then, the specialist manager identifies specialists to be called from an internal specialist list when the call (or phone call) and message-related contact events occur in step 1706. Then, the specialist manager calls the specialists in step 1708. (FIG. 4 illustrates an example in which a specialist of ID 5 is called.)

Among the called specialists, the specialist of ID 5 is provided to notify that a substantial number of contacts with a contact person that has been recently made when a substantial number of a call (or phone call) and/or message-related contact with the contact person (or his/her phone number) has been recently made. In step 1712, the call (or phone call) and/or message-related contact records for one recent week are analyzed. Then, a determination is made as to whether the substantial number of a call (or phone call) and/or message-related contact with the contact person (and his/her phone number) has been made at least a threshold number of times (for example, at least five times) for a predetermined period (for example, one recent week) in step 1714. If the substantial number of contacts with an associated contact person has not been made, the operation proceeds to step 1716 to return the 'NO' signal to the specialist manager. However, if the substantial number of contacts with the associated contact person has been made, the operation proceeds to step 1718 to return the 'YES' signal to the specialist manager.

Figure 26A:
Figure 26B:
Figure 26C:
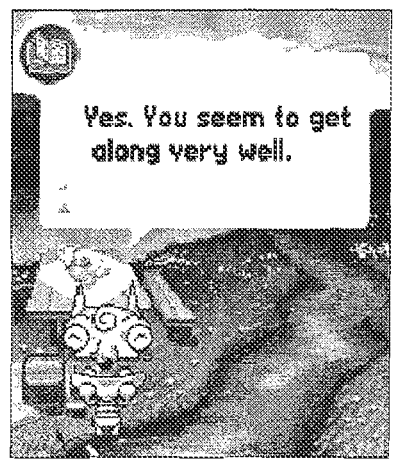
Figure 26D:

When a called specialist makes the return, the specialist manager provides a supervisor with an ID of the specialist returning the 'YES' signal (for example, Specialist ID 5 of FIG. 4) in step 1720. Then, the supervisor identifies priorities of associated specialists or identifies the execution of an associated specialist when the number of specialists returning 'YES' is one in step 1722. In step 1724, the supervisor sends, to the specialist manager, a result of the identification for the highest priority specialist or the execution of the associated specialist. Then, the specialist manager identifies a UI ID of the highest priority specialist or the specialist to be executed in step 1726 and sends the identified UI ID to an agent expression unit in step 1728. In step 1730, the agent expression unit expresses an associated UI. When the specialist manager sends the UI ID to the agent expression unit, information of an associated contact person can also be sent. Along with the information of the associated contact person, text indicating that a substantial number of a call/message-related contact with the associated contact person has been made can be expressed as illustrated in FIG. 26A. In response to the user's feedback, a character and/or text can be expressed as illustrated in FIG. 26B, FIG. 26C, or FIG. 26D. The expressed character and/or text disappear when a predetermined time elapses or a predetermined key is input.

FIG. 5 is a flowchart illustrating an operation for setting up a relation to a contact person who has made continuous call/message-related contact (or registering the person in a specific group) using a character agent in accordance with an exemplary embodiment of the present invention.

Referring to FIG. 5, an event collection unit (not illustrated) collects a call (or phone call) and message-related contact events when the call (or phone call) and message-related contact events occur. The call (or phone call) and message-related contact events may be phone call termination events, incoming phone call reception events, outgoing phone call transmission events, message reception events, and/or message transmission events. Then, the call (or phone call) and message-related contact events are provided to an event delivery unit (not illustrated). The event delivery unit (not illustrated) provides the events to a specialist manager of an agent control unit in step 1802. The specialist manager stores the call (or phone call) and message-related contact events in a blackboard in step 1804. Then, the specialist manager identifies specialists to be called from an internal specialist list when the call (or phone call) and message-related contact events occur in step 1806. Then, the specialist manager calls the specialists in step 1808. (FIG. 5 illustrates an example in which a specialist of ID 6 is called.)

Among the called specialists, the specialist of ID 6 is provided to a recommend relation setup (or group registration) when a continuous call (or phone call) and/or message-related contact with a contact person has been made, but a relation to the contact person (or his/her phone number) has not been set up (or the contact person (or his/her phone number) has not been registered in a specific group). In step 1812, the call (or phone call) and/or message-related contact records for one recent month are analyzed. Then, a determination is made as to whether the call (or phone call) and/or message-related contact with a contact person (or his/her phone number) has been made at least a threshold number of times (for example, at least seven times) for a predetermined period (for example, one recent month) in step 1814. If continuous contact with an associated contact person has not been made (at least a threshold number of times of at least seven times for a predetermined period of one month), the operation proceeds to step 1814 to return the 'NO' signal to the specialist manager. However, if continuous contact with the associated contact person has been made, the operation proceeds to step 1816 to return the 'YES' signal. In step 1816, a determination is made as to whether a relation to the contact person (or his/her phone number) has been set up or has been registered in a specific group). If the relation setup (or group registration) has been made, the operation proceeds to step 1818 to return the 'NO' signal to the specialist manager. However, if a relation to the contact person (or his/her phone number) has not been set up or has not been registered in a specific group, the operation proceeds to step 1820 to return the 'YES' signal to the specialist manager.

When a called specialist makes the return, the specialist manager provides a supervisor with an ID of the specialist returning the 'YES' signal (for example, Specialist ID 6 of FIG. 5) in step 1822. Then, the supervisor identifies priorities of associated specialists or identifies the execution of an associated specialist when the number of specialists returning the 'YES' signal is one in step 1824. In step 1826, the supervisor sends, to the specialist manager, a result of the identification for the highest priority specialist or the execution of the associated specialist. Then, the specialist manager identifies a UI ID of the highest priority specialist or the specialist to be executed in step 1828 and sends the identified UI ID to an agent expression unit in step 1830. In step 1832, the agent expression unit expresses an associated UI. When the specialist manager sends the UI ID to the agent expression unit, information of an associated contact person can also be sent.

When this agent expression unit expresses a UI, for example, a UI mapped to Specialist ID 6, text for recommending the setup of a relation (or group) for an associated contact person of a call (or phone call) and/or message (or his/her phone number) can be included and expressed as illustrated in FIG. 27A. When an image and text for setting a character with a happy expression and/or a relation (or group) type are expressed and the relation (or group) is set up according to the user's feedback as illustrated in FIG. 27B, a character with a happy expression and/or text indicating that the associated contact person (or his/her phone number) will be registered are expressed as illustrated in FIG. 27C or a character with a sad expression and/or text indicating that the associated contact person (or his/her phone number) will not be registered are expressed as illustrated in FIG. 27D. When a predetermined time elapses or a predetermined key is input, the expressed character and/or text disappear. The information of the contact person includes a phone number and ID of the contact person who has made the call and/or message-related contact.

In accordance with an exemplary embodiment of the present invention, a recommendation can be made for relation setup or group registration associated with a contact person who has made a regular call (or phone call) and/or message-related contact (at least a threshold number of times per second predetermined period, for a first predetermined period). For example, a determination is made as to whether the relation setup (or group registration) for the contact person has been performed when the call (or phone call) and/or message-related contact with the contact person has been made at least one time per week for one month. If the relation setup (or group registration) for the contact person has not been made, a character and/or text for recommending the relation setup (or group registration) can be expressed.

FIG. 6 is a flowchart illustrating an operation for setting up an alarm for recommending contact with a specific person who has previously made regular contact, but has not recently made contact using a character agent in accordance with an exemplary embodiment of the present invention.

Referring to FIG. 6, an event collection unit (not illustrated) collects a call (or phone call) and message-related contact events when the call (or phone call) and message-related contact events occur. The call (or phone call) and message-related contact events may be phone call termination events, incoming phone call reception events, outgoing phone call transmission events, message reception events, and/or message transmission events. Then, the call (or phone call) and message-related contact events are provided to an event delivery unit (not illustrated). The event delivery unit (not illustrated) provides the events to a specialist manager of an agent control unit in step 1902. The specialist manager stores the call (or phone call) and message-related contact events in a blackboard in step 1904. Then, the specialist manager identifies specialists to be called from an internal specialist list when the call (or phone call) and message-related contact events occur in step 1906. Then, the specialist manager calls the specialists in step 1908. (FIG. 6 illustrates an example in which a specialist of ID 7 is called.)

Among the called specialists, the specialist of ID 7 is provided to recommend the call (or phone call) and/or message-related contact with a contact person (or his/her phone number) when a regular call (or phone call) and/or message-related contact with the contact person (or his/her phone number) has been made at least a predetermined number of times per second predetermined period, for a first predetermined period, but has not been made for the next third predetermined period. For example, the specialist of ID 7 recommends the call (or phone call) and/or message-related contact with a contact person (or his/her phone number) when the regular phone call and/or message-related contact with the contact person has been made at least a threshold number of times (for example, at least one time) per second predetermined period (for example, one week) for the first predetermined period (for example, one month), but has not been made for the next third predetermined period (for example, three weeks).

In step 1910, the specialist of ID 7 identifies the blackboard and determines if the regular call (or phone call) and/or message-related contact with the associated contact person (at least the threshold number of times per second predetermined period, for the first predetermined period). For example, the specialist of ID 7 determines if the regular call (or phone call) and/or message-related contact with the associated contact person (or his/her phone number) has been made at least one time per week for one month.

If the regular call (or phone call) and/or message-related contact with the associated contact person has not been made (at least a threshold number of times (for example, at least one time) per second predetermined period (for example, week) for the first predetermined period (for example, one month) as a determination result, the operation proceeds to step 1912 to return the 'NO' signal to the specialist manager. However, if regular call (or phone call) and/or message-related contact with the associated contact person has been made (at least a threshold number of times (for example, at least one time) per second predetermined period (for example, week) for the first predetermined period (for example, one month)) as a determination result, the operation proceeds to step 1914. In step 1914, an alarm of ID 7 is set up. In the ID7 alarm setup, an alarm occurrence time (that is, a predetermined time after three weeks of the third predetermined period from the ID7 alarm setup time) is set, and an associated contact person is registered for the ID7 alarm. If the ID7 alarm has been previously set up, the ID7 alarm time is reset to the next occurrence time. Then, the operation proceeds to step 1916 to return the 'ID7 alarm setup' signal to the specialist manager. For example, the 'ID7 alarm' is set up and the 'ID7 alarm setup' signal is returned to the specialist manager when the call (or phone call) and/or message-related contact with the associated contact person has been made at least one time in the first week of the month, at least one time in the second week of the month, at least one time in the third week of the month, and at least one time in the fourth week of the month.

When a called specialist (that is, the specialist of ID 7) makes the return, the specialist manager provides a supervisor with an ID of the specialist returning the 'YES' signal. In FIG. 6, the number of specialists called at the time of a call (or phone call) and/or message-related contact event is one, corresponding to the specialist of ID 7, in accordance with an exemplary embodiment of the present invention. In this case, another specialist ID to be sent from the specialist manager to the supervisor is absent because the associated specialist of ID 7 returns the 'NO' signal and the 'ID7 alarm setup' signal. In an exemplary embodiment of the present invention, the specialist can be configured such that it performs a suitable operation at the time of an associated call (or phone call) and/or message-related contact event and returns the 'YES' signal. In this case, the specialist manager can provide the supervisor with an ID of a specialist returning an associated 'ID7 alarm setup' signal. Then, the supervisor identifies priorities of associated specialists or identifies the execution of an associated specialist. The supervisor sends, to the specialist manager, a result of the identification for the highest priority specialist or the execution of the associated specialist. Then, the specialist manager identifies a UI ID of the highest priority specialist or the specialist to be executed and sends the identified UI ID to an agent expression unit (not illustrated). The agent expression unit expresses an associated UI (or alarm registration UI).

FIG. 7 is a flowchart illustrating an operation for recommending contact with a specific person who has previously made regular contact but has not recently made contact using a character agent, in accordance with an exemplary embodiment of the present invention.

In FIG. 7, the specialist manager stores a received call (or phone call) and/or message-related alarm events in a blackboard in step 1952 when receiving the call (or phone call) and/or message-related alarm events in step 1950. Then, the specialist manager identifies specialists to be called from an internal specialist list when the call (or phone call) and message-related alarm events occur in step 1954. Then, the specialist manager calls the specialists in step 1956. (FIG. 7 illustrates an example in which a specialist of ID 7 is called.)

The specialist of ID 7 called is provided to a recommend call (or phone call) and/or message-related contact with an associated contact person (or his/her phone number) when regular contact with the contact person has been made at least a predetermined number of times per second predetermined period, for a first predetermined period, but has not been made for the next third predetermined period.

Then, the specialist of ID 7 analyzes the call (or phone call) and/or message-related contact records through the blackboard and determines if a regular call (or phone call) and/or message-related contact with the associated contact person has been made (at least a threshold number of times per second predetermined period, for the first predetermined period) and the contact with the associated contact person registered for the ID7 alarm event has been recently made at least a threshold number of time (for example, at least one time) for three weeks of the third predetermined period from the time of the ID7 alarm event setup. If the call (or phone call) and/or message-related contact with the associated contact person has not been recently made at least a threshold number of times (for example, at least one time), the operation proceeds to step 1960 to return the 'YES' signal to the specialist manager. When the 'YES' signal is returned, information of the associated contact person can also be returned. For example, if regular call (or phone call) and/or message-related contact with the associated contact person has been made at least one time per week for the last month, the ID7 alarm event has been set up, and the regular contact with the associated contact person registered for the ID7 alarm event has been recently made at least one time for three weeks from the time of the ID7 alarm event setup, the 'YES' signal is returned to the specialist manager.

If the call (or phone call) and/or message-related contact with the associated contact person registered for the ID7 alarm event has been recently made at least a threshold number of time (for example, at least one time) for three weeks of the third predetermined period from the time of the ID7 alarm event setup as a determination result, the operation proceeds to step 1964 to return the 'NO' signal to the specialist manager.

Figure 28A:
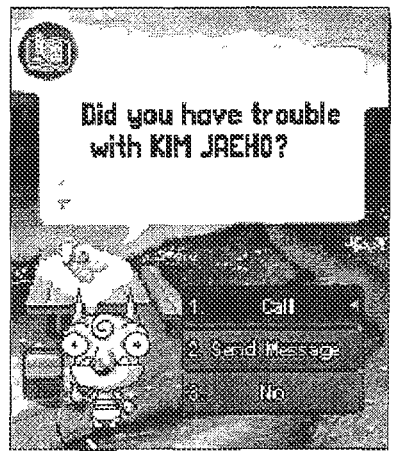
Figure 28B:
Figure 28C:
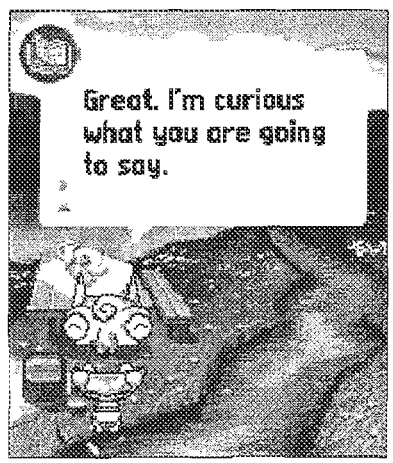
Figure 28D:

When a called specialist (that is, the specialist of ID 7) makes the return, the specialist manager provides the supervisor with an ID of the specialist returning the 'YES' signal in step 1966. Then, the supervisor identifies priorities of associated specialists or identifies the execution of an associated specialist in step 1968. In step 1970, the supervisor sends, to the specialist manager, a result of the identification for the highest priority specialist or the execution of the associated specialist. Then, the specialist manager identifies a UI ID of the highest priority specialist or the specialist to be executed in step 1972 and sends the identified UI ID to the agent expression unit in step 1974. In step 1976, the agent expression unit expresses an associated UI. When the specialist manager sends the UI ID to the agent expression unit, information of an associated contact person can also be sent. When this agent expression unit expresses a UI, text for a recommending call (or phone call) and/or message-related contact with an associated contact person (or his/her phone number) can be expressed along with information of the associated contact person as illustrated in FIG. 28A. According to the user's feedback, text and/or a character with a happy expression are expressed for identifying acceptance of a phone call-related contact with the associated contact person (or his/her contact information) as illustrated in FIG. 28B. According to the user's feedback, text and/or a character with a happy expression are expressed for identifying acceptance of message-related contact with the associated contact person (or his/her contact information) as illustrated in FIG. 28C. According to the user's feedback, text and/or a character with a sad expression are expressed for identifying rejection of phone call and message-related contact with the associated contact person (or his/her contact information) as illustrated in FIG. 28D. When a predetermined time elapses or a predetermined key is input, the expressed character and/or text disappear.

In accordance with an exemplary embodiment of the present invention, the ID7 alarm event may occur. First and second timers corresponding to reference time parameters are set in relation to a contact person (or his/her phone number) such that a determination can be made as to whether the user has recently made much or little contact with the contact person. When the call (or phone call) and/or message-related contact with the contact person has not been made for periods set in the first and second timers, the ID7 alarm event occurs. However, when the call (or phone call) and/or message-related contact with the contact person has been made for the periods set in the first and second timers, the ID7 alarm event does not occur and the first and second set timers are deleted. When the call (or phone call) and/or message-related contact with the contact person has been made for the periods set in the first and second timers, new first and second timers are set. Here, the first timer is used for the reference time for detecting the contact person who has made little contact for a relatively short period for example, one week), and the second timer is used for the reference time for detecting the contact person who has made little contact for a longer period (for example, one month) than the first timer.

For example, if the first timer for the contact person's phone number of '010-234-5673' has timed out as a result of checking the timer at the current reference time (for example, February 7), it means that the first timer has never been updated for one recent week (for example, February 1~7). Accordingly, transmission to and reception from the phone number of the associated contact person has not been performed for one recent week. In relation to the phone number of '010-234-5673', the number of contact events for a period (for example, January 25~31) before two weeks is compared with that of contact events for a period (for example, January 18~24) before three weeks. According to a result of the comparison, a determination is made as to whether little contact with the associated contact person has been made. If the number of contact events for the period before the two weeks is a predetermined ratio, that is, 50%, less than that of contact events for the period before three weeks, a determination is made that little contact with the associated contact person has been made. If the second timer for the contact person's phone number of '010-234-5673' has timed out as a result of checking the timer at the current reference time, it means that the second timer has never been updated for one recent month (for example, March 1~31). In this case, because a comparison associated with the number of contact events for one recent month is not useful, the number of contact events before two months is compared with that of contact events before three months. If the user has made little contact with the associated contact person as a result of the comparison, a recommendation for contact with a phone number of the associated contact person is made and an associated second timer is deleted.

FIG. 8 is a flowchart illustrating an operation for recommending contact with a specific person who has generally made little contact using a character agent in accordance with an exemplary embodiment of the present invention. Hereinafter, an ID 8 alarm event may be set as a default and may occur in a preset period. When call and message-related events, such as a phone call transmission event, phone call reception event, message transmission event, and message read event occur, the occurred events are collected and stored, and an associated alarm event can be set according to an occurred event. For example, when call and message-related events such as a phone call transmission event, phone call reception event, message transmission event, and message read event occur, information of a specific person with whom contact has been made through the occurred call and message-related event is analyzed. The ID 8 alarm event can be set to recommend call or message-related contact with a specific person who has generally made little contact through the call and message-related event.

Referring to FIG. 8, the specialist manager stores a received alarm event in the blackboard in step 2004 when the alarm event (for example, ID 8) is delivered in step 2002. Then, the specialist manager identifies specialists to be called from an internal specialist list when an associated alarm event occurs in step 2006. Then, the specialist manager calls the specialists in step 2008. The called specialist of ID 8 is provided to recommend phone call/message-related contact with a specific person who has generally made little contact. For example, the alarm is reset, for example, after N days, in step 2010 (Alarm ID 8). This alarm reset is called and operated in a period of N (one month). For example, when the occurrence time of the alarm event is 2 p.m. on November 10 and the period N is one month, the occurrence time of the next alarm event is 2 p.m. on December 10.

Then, the specialist of ID 8 analyzes call (or phone call) and/or message-related event records, such as phone call transmission, phone call reception, message transmission, and message reception through the blackboard, on a contact person-by-contact person basis in step 2012. That is, the specialist of ID 8 determines if a specific person who has made little contact for a recent period (one month) or information of the specific person is present by comparing the number of calls/messages for last month with that of calls/messages for this month on the contact person-by-contact person basis, and determining if a comparison result is less than a preset reference value. If the associated specific person is absent in step 2014, the operation proceeds to step 2016 to return the 'NO' signal to the specialist manager. However, if the associated specific person is present in step 2014, the operation proceeds to step 2018 to return the 'YES' signal to the specialist manager. When the 'YES' signal is returned, information of the specific person can also be returned. Here, the information of the specific person indicates a phone number and ID of the specific person.

Figure 29A:

When a called specialist (that is, the specialist of ID 8) makes the return, the specialist manager provides the supervisor with an ID of the specialist returning the 'YES' signal in step 2020. Then, the supervisor identifies priorities of associated specialists or identifies the execution of an associated specialist in step 2022. In step 2024, the supervisor sends, to the specialist manager, a result of the identification for the highest priority specialist or the execution of the associated specialist. Then, the specialist manager identifies a UI ID of the highest priority specialist or the specialist to be executed in step 2026 and sends the identified UI ID to the agent expression unit in step 2028. In step 2030, the agent expression unit expresses an associated UI. When the specialist manager sends the UI ID to the agent expression unit, information of an associated specific person can also be sent. When the agent expression unit expresses a UI, text for recommending contact with the associated specific person as illustrated in FIG. 29A can be expressed along with the information of the specific person. Here, if there are a number of associated specific persons, priorities of the specific persons are set and the text can recommend phone call/message-related contact with the specific person of the highest priority or can recommend sequential contact with the specific persons according to the priorities. Here, priorities are assigned on a phone number-by-phone number basis. For example, when it is assumed that phone numbers of specific persons who have made little contact are phone numbers of an elder brother and alumnus of an elementary school, the text can recommend contact with the elder brother of the higher priority using his/her phone number.

Figure 29B:
Figure 29C:
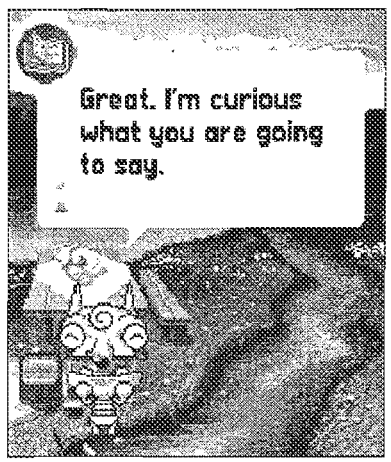
Figure 29D:

According to the user's feedback, a character with a happy expression and/or text are expressed for identifying acceptance of phone call-related contact with the associated specific person (or his/her information) as illustrated in FIG. 29B. According to the user's feedback, a character with a happy expression and/or text are expressed for identifying acceptance of message-related contact with the associated specific person (or his/her information) as illustrated in FIG. 29C. According to the user's feedback, a character with a sad expression and/or text are expressed for identifying rejection of phone call and message-related contact with the associated specific person (or his/her information) as illustrated in FIG. 29D. When a predetermined time elapses or a predetermined key is input, the expressed character and/or text disappear.

FIG. 9 is a flowchart illustrating an operation for recommending contact with a specific person of a specific group who has recently made little contact using a character agent in accordance with an exemplary embodiment of the present invention. Hereinafter, an ID 10 alarm event may be set as a default and may occur in a preset period. When call and message-related events such as a phone call transmission event, phone call reception event, message transmission event, and message read event occur, the occurred events are collected and stored, and an associated alarm event can be set according to an occurred event. For example, when call and message-related events such as a phone call transmission event, phone call reception event, message transmission event, and message read event occur, information of a specific person with whom contact has been made through the occurred call and message-related event is analyzed. The ID 10 alarm event can be set to recommend the call or message-related contact with a specific person who has recently made little contact through the call and message-related event.

Referring to FIG. 9, the specialist manager stores a received alarm event in the blackboard in step 2104 when the alarm event (for example, ID 10) is delivered in step 2102. Then, the specialist manager identifies specialists to be called from an internal specialist list when an associated alarm event occurs in step 2106. Then, the specialist manager calls the specialists in step 2108. The called specialist of ID 10 is provided to recommend phone call/message-related contact with a specific person of a specific group who has recently made little contact. Then, the alarm is reset, for example, after N days, in step 2110 (Alarm ID 10). This alarm reset is called and operated in a period of N (one week). For example, when the occurrence time of the alarm event is 2 p.m. on November 10 and the period N is one week, the occurrence time of the next alarm event is 2 p.m. on November 17.

Then, the specialist of ID 10 analyzes call (or phone call) and/or message-related contact records such as phone call transmission, phone call reception, message transmission, and message reception through the blackboard on a contact person-by-contact person basis in the specific group in step 2112. That is, the specialist of ID 10 determines if a specific person who has made little contact for a recent period (one week) or information of the specific person is present by determining if the number of calls/messages for one recent week is less than a preset reference value on the contact person-by-contact person basis in the specific group. If the associated specific person is absent in step 2114, the operation proceeds to step 2116 to return the 'NO' signal to the specialist manager. However, if the associated specific person is present in step 2114, the operation proceeds to step 2118 to return the 'YES' signal to the specialist manager. When the 'YES' signal is returned, information of the specific person can also be returned. Here, the information of the specific person indicates a phone number and ID of the specific person.

Figure 30A:
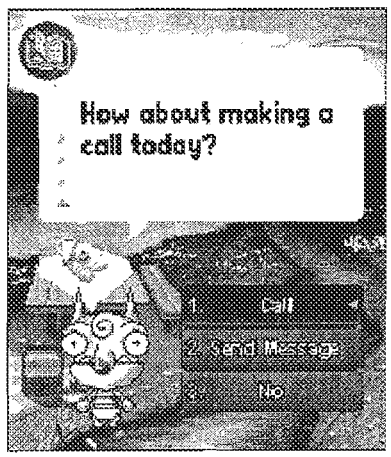
Figure 30B:
Figure 30C:
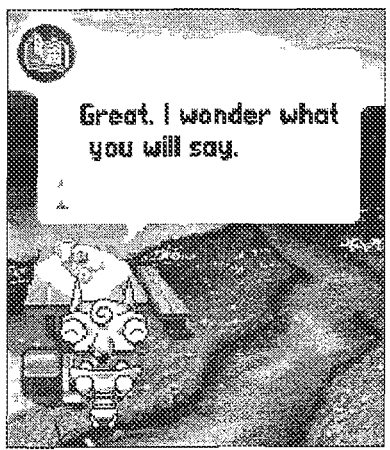
Figure 30D:

When a called specialist (that is, the specialist of ID 10) makes the return, the specialist manager provides the supervisor with an ID of the specialist returning the 'YES' signal in step 2120. Then, the supervisor identifies priorities of associated specialists or identifies the execution of an associated specialist in step 2122. In step 2124, the supervisor sends, to the specialist manager, a result of the identification for the highest priority specialist or the execution of the associated specialist. Then, the specialist manager identifies a UI ID of the highest priority specialist or the specialist to be executed in step 2126 and sends the identified UI ID to the agent expression unit in step 2128. In step 2130, the agent expression unit expresses an associated UI. When the specialist manager sends the UI ID to the agent expression unit, information of an associated specific person can also be sent. When the agent expression unit expresses a UI, text for recommending phone call/message-related contact with the associated specific person as illustrated in FIG. 30(A) can be expressed along with the information of the specific person. According to the user's feedback, a character with a happy expression and/or text are expressed for identifying acceptance of phone call-related contact with the associated specific person (or his/her information) as illustrated in FIG. 30B. According to the user's feedback, a character with a happy expression and/or text are expressed for identifying acceptance of message-related contact with the associated specific person (or his/her information) as illustrated in FIG. 30C. According to the user's feedback, a character with a sad expression and/or text are expressed for identifying rejection of the phone call and message-related contact with the associated specific person (or his/her information) as illustrated in FIG. 30D. When a predetermined time elapses or a predetermined key is input, the expressed character and/or text disappear.

FIG. 10 is a flowchart illustrating an operation for giving notification of the number of calls/messages for this week using a character agent in accordance with an exemplary embodiment of the present invention. Hereinafter, an ID39 alarm event may be set as a default and may occur in a preset period.

Referring to FIG. 10, the specialist manager stores a received alarm event in the blackboard in step 2204 when the alarm event (for example, ID 39) is delivered in step 2202. Then, the specialist manager identifies specialists to be called from an internal specialist list when an associated alarm event occurs in step 2206. Then, the specialist manager calls the specialists in step 2208. The called specialist of ID 39 is provided to give notification of the number of calls/messages for this week. Then, the alarm is reset, for example, after N days (for example, at 21:00 on Saturday of the next week), in step 2210 (Alarm ID 39). This alarm reset is called and operated at 21:00 on Saturday of the next week. Accordingly, the specialist of ID 39 is repeatedly called and operated in a period of one week. For example, when the occurrence time of the alarm event is 21:00 on Saturday, November 20 and the period N is one week, the occurrence time of the next alarm event is 21:00 on Saturday, November 27.

Then, the specialist of ID 39 analyzes call (or phone call) and/or message-related event records such as a phone call transmission, phone call reception, message transmission, and message reception through the blackboard on a contact person-by-contact person basis in step 2212. That is, the specialist of ID 39 identifies, compares, and analyzes phone call transmission amounts, phone call reception amounts, message transmission amounts, and message transmission amounts for a first predetermined period (from 21:00 on Saturday, November 5, to 21:00 on Saturday, November 12, corresponding to a period of last week) and a second predetermined period (from 21:00 on Saturday, November 12, to 21:00 on Saturday, November 19, corresponding to a period of this week). Then, the 'YES' signal is returned to the specialist manager in step 2214. When the 'YES' signal is returned, information of a result of the comparison and analysis can also be returned.

When a called specialist (that is, the specialist of ID 39) makes the return, the specialist manager provides the supervisor with an ID of the specialist returning the 'YES' signal in step 2216. Then, the supervisor identifies priorities of associated specialists or identifies the execution of an associated specialist in step 2218. In step 2220, the supervisor sends to the specialist manager, a result of the identification for the highest priority specialist or the execution of the associated specialist. Then, the specialist manager identifies a UI ID of the highest priority specialist or the specialist to be executed in step 2222 and sends the identified UI ID to the agent expression unit in step 2224. In step 2226, the agent expression unit expresses an associated UI. When the specialist manager sends the UI ID to the agent expression unit, information of a result of the associated comparison and analysis can also be sent. When the agent expression unit expresses a UI, text for giving notification of the number of calls/messages for last and this week as illustrated in FIG. 31 can be expressed along with the information of the result of the associated comparison and analysis.

FIG. 11 is a flowchart illustrating an operation for giving notification of the number of calls/messages for this month using a character agent in accordance with an exemplary embodiment of the present invention. Hereinafter, an ID40 alarm event may be set as a default and may occur in a preset period.

Referring to FIG. 11, the specialist manager stores a received alarm event in the blackboard in step 2304 when the alarm event (for example, ID 40) is delivered in step 2302. Then, the specialist manager identifies specialists to be called from an internal specialist list when an associated alarm event occurs in step 2306. Then, the specialist manager calls the specialists in step 2308. The called specialist of ID 40 is provided to give notification of the number of calls/messages for this month. Then, the alarm is reset, for example, after N months (for example, at 21:00 on the last day of the next month), in step 2310 (Alarm ID 40). This alarm reset is called and operated at 21:00 on the last day of the next month. Accordingly, the specialist of ID 40 is repeatedly called and operated in a period of one month. For example, when the occurrence time of the alarm event is 21:00 on October 31 and the period N is one month, the occurrence time of the next alarm event is 21:00 on November 30.

Then, the specialist of ID 40 analyzes call (or phone call) and/or message-related event records such as phone call transmission, phone call reception, message transmission, and message reception through the blackboard on a contact person-by-contact person basis in step 2312. That is, the specialist of ID 40 identifies, compares, and analyzes phone call transmission amounts, phone call reception amounts, message transmission amounts, and message transmission amounts for a first period (from 21:00 on September 30 to 21:00 on October 31, corresponding to a period of last month) and a second period (from 21:00 on October 31 to 21:00 on November 30, corresponding to a period of this month). Then, the 'YES' signal is returned to the specialist manager in step 2314. When the 'YES' signal is returned, information of a result of the comparison and analysis can also be returned.

When a called specialist (that is, the specialist of ID 40) makes the return, the specialist manager provides the supervisor with an ID of the specialist returning the 'YES' signal in step 2316. Then, the supervisor identifies priorities of associated specialists or identifies the execution of an associated specialist in step 2318. In step 2320, the supervisor sends to the specialist manager, a result of the identification for the highest priority specialist or the execution of the associated specialist. Then, the specialist manager identifies a UI ID of the highest priority specialist or the specialist to be executed in step 2322 and sends the identified UI ID to the agent expression unit in step 2324. In step 2326, the agent expression unit expresses an associated UI. When the specialist manager sends the UI ID to the agent expression unit, information of a result of the associated comparison and analysis can also be sent. When the agent expression unit expresses a UI, text for giving notification of the number of calls/messages for the last or this month can be expressed along with the information of the result of the associated comparison and analysis as illustrated in FIG. 32.

FIG. 12 is a flowchart illustrating an operation for giving notification indicating if some work on today's TO-DO list has been completed using a character agent in accordance with an embodiment of the present invention. Hereinafter, an ID33 alarm event may be set as a default and may occur in a preset period. The TO-DO list indicates today's work items registered for a schedule management function. When some work registered in the TO-DO list is performed, a result of execution completion can be automatically or manually recognized. For example, some work on the TO-DO list may be call and message-related events such as an event for making phone call-related contact with a specific person at a specific time and an event for making message-related contact with a specific person at a specific time.

Referring to FIG. 12, the specialist manager stores a received alarm event in the blackboard in step 2404 when the alarm event (for example, ID 33) is delivered in step 2402. Then, the specialist manager identifies specialists to be called from an internal specialist list when an associated alarm event occurs in step 2406. Then, the specialist manager calls the specialists in step 2408. The called specialist of ID 33 is provided to give notification indicating if some work on today's TO-DO list has been completed. Then, the alarm is reset, for example, after N days, in step 2410 (Alarm ID 33). This alarm reset is called and operated in a period N of one day. For example, when the occurrence time of the alarm event is 22:00 on November 10 and the period N is one day, the occurrence time of the next alarm event is 22:00 on November 11. Then, the specialist of ID 33 identifies today's TO-DO list through the memory or blackboard in step 2412. A determination is made as to whether some work on the TO-DO list has been completed in step 2414. If an undone work item is absent in today's TO-DO list as a determination result, the operation proceeds to step 2416 to return the 'NO' signal to the specialist manager. However, if the undone work item is present in today's TO-DO list as a determination result, the operation proceeds to step 2418 to return the 'YES' signal to the specialist manager. When the 'YES' signal is returned, information of the undone work item of the TO-DO list can also be returned.

When a called specialist (that is, the specialist of ID 33) makes the return, the specialist manager provides the supervisor with an ID of the specialist returning the 'YES' signal in step 2420. Then, the supervisor identifies priorities of associated specialists or identifies the execution of an associated specialist in step 2422. In step 2424, the supervisor sends, to the specialist manager, a result of the identification for the highest priority specialist or the execution of the associated specialist. Then, the specialist manager identifies a UI ID of the highest priority specialist or the specialist to be executed in step 2426, and sends the identified UI ID to the agent expression unit in step 2428. In step 2430, the agent expression unit expresses an associated UI. When the specialist manager sends the UI ID to the agent expression unit, information of an undone work item of today's TO-DO list can also be sent. When the agent expression unit expresses a UI, text for recommending a check of the information of the undone work item of the TO-DO list as illustrated in FIG. 33A can be expressed along with the information of the specific person. According to the user's feedback, a character with a happy expression and/or text are expressed for identifying acceptance of a check of an undone work item of the TO-DO list as illustrated in FIG. 33B. According to the user's feedback, a character with a sad expression and/or text are expressed which indicate that an undone work item of the TO-DO list has not been checked as illustrated in FIG. 33C. When a predetermined time elapses or a predetermined key is input, the expressed character and/or text disappear.

FIG. 13 is a flowchart illustrating an operation for giving notification indicating if some work on yesterday's TO-DO list has been completed using a character agent in accordance with an exemplary embodiment of the present invention. Referring to FIG. 13, the specialist manager stores a received alarm event in the blackboard in step 2504 when the alarm event (for example, ID 34) is delivered in step 2502. Then, the specialist manager identifies specialists to be called from an internal specialist list when an associated alarm event occurs in step 2506. Then, the specialist manager calls the specialists in step 2508. The called specialist of ID 34 is provided to give notification indicating if some work on yesterday's TO-DO list has been completed. Then, the alarm is reset, for example, after N days, in step 2510 (Alarm ID 34). This alarm reset is called in a period N of one day and an associated operation is again performed at 8 a.m. on the next day. For example, when the occurrence time of the alarm event is 8 a.m. on November 10 and the period N is one day, the occurrence time of the next alarm event is 8 a.m. on November 11.

Then, the specialist of ID 34 identifies yesterday's TO-DO list through the memory or blackboard in step 2512. A determination is made as to whether some work on the TO-DO list has been completed in step 2514. If an undone work item is absent in yesterday's TO-DO list as a determination result, the operation proceeds to step 2516 to return the 'NO' signal to the specialist manager. However, if an undone work item is present in yesterday's TO-DO list as a determination result, the operation proceeds to step 2518 to return the 'YES' signal to the specialist manager. When the 'YES' signal is returned, information of the undone work item of yesterday's TO-DO list can also be returned.

When a called specialist (that is, a specialist of ID 34) makes the return, the specialist manager provides the supervisor with an ID of the specialist returning the 'YES' signal in step 2520. Then, the supervisor identifies priorities of associated specialists or identifies the execution of an associated specialist in step 2522. In step 2524, the supervisor sends, to the specialist manager, a result of the identification for the highest priority specialist or the execution of the associated specialist. Then, the specialist manager identifies a UI ID of the highest priority specialist or the specialist to be executed in step 2526 and sends the identified UI ID to the agent expression unit in step 2528. In step 2530, the agent expression unit expresses an associated UI. When the specialist manager sends the UI ID to the agent expression unit, information of the undone work item of yesterday's TO-DO list can also be sent. When the agent expression unit expresses a UI, text for recommending a check of the information of the undone work item of yesterday's TO-DO list as illustrated in FIG. 34A can be expressed along with the information of the specific person. According to the user's feedback, a character with a happy expression and/or text are expressed for identifying acceptance of a check of the undone work item of the TO-DO list has been accepted as illustrated in FIG. 34B. According to the user's feedback, a character with a sad expression and/or text are expressed which indicate that the undone work item of the TO-DO list has not been checked as illustrated in FIG. 34C. When a predetermined time elapses or a predetermined key is input, the expressed character and/or text disappear.

An operation for processing an application program-related event of a wireless terminal on a specialist-by-specialist basis using a character agent as described above can be performed. The overall operation for processing an application program-related event of the wireless terminal will be described with reference to the accompanying drawings. To implement the present invention, the controller 100 controls a single agent system without functional blocks and controls the memory 23 and the display unit 27. In this case, the memory 23 can collect and store events occurring in the wireless terminal.

FIG. 14 is a flowchart illustrating an operation for setting up a relation to a contact person who has made a call/message-related contact (or registering the contact person in a specific group) in the wireless terminal in accordance with an exemplary embodiment of the present invention. An operation for recommending relation setup (or registration in a specific group) when frequent contact with the contact person (or his/her phone number) has been recently made, but a relation to the contact person (or his/her phone number) has not been set up or has not been registered in a specific group, will be described with reference to FIG. 14. When a call (or phone call) or message-related contact event occurs in idle mode in step 3002, the controller 100 identifies the occurred event in step 3004 and proceeds to step 3006. Here, call (or phone call) and message-related contact events may be phone call termination events, incoming phone call reception events, outgoing phone call transmission events, message reception events, and/or message transmission events. When the phone call termination event occurs, step 3002 may be a state of phone call connection mode.

In step 3006, the controller 100 analyzes call (or phone call) and/or message-related contact records for one recent week. In step 3008, the controller 100 determines if the call (or phone call) and/or message-related contact with a contact person (or his/her phone number) has been frequently made at least a threshold number of times (for example, at least three times) for a predetermined period (for example, one recent week).

If the call (or phone call) and/or message-related contact with an associated contact person (or his/her phone number) has not been made at least a threshold number of times as a determination result in step 3010, the controller 100 proceeds to the step for ending the operation. However, if contact with an associated contact person has been made at least a threshold number of times as a determination result, the operation proceeds to step 3012. In step 3012, the controller 100 determines if relation setup (or registration in a specific group) has been performed for the associated contact person (or his/her phone number) in a contact person list (for example, a phone number list or a phone book). If the associated contact person (or his/her phone number) has been registered in the contact person list (for example, a phone number list, phone book, or specific group) and a relation (or group) has been set up as a determination result, the controller proceeds to the step for ending the operation. However, if the associated contact person (or his/her phone number) has not been registered in a contact person list (for example, a phone number list, phone book, or specific group) and a relation (or group) has not been set up as a determination result, the controller 100 detects that the contact person has not been registered in step 3014 and proceeds to step 3016. In step 3016, the controller 100 expresses a selection button list and expresses a character and text for recommending the setup of a relation (or group) for an associated contact person (or his/her phone number) of a call (or phone call) and/or message as illustrated in FIG. 25A.

When the user selects 'YES' corresponding to Item No. 1 from the selection button list, the controller 100 detects the selected item in step 3018 and then proceeds to step 3020 to express a feedback for accepting the setup of a relation (or group) for an associated contact person (or his/her phone number). The feedback for accepting the setup of a relation (or group) is expressed by a character with a happy expression and/or an image and text for setting a relation (or group) type as illustrated in FIG. 25B. When the relation (or group) type is set, the controller 100 expresses a character with a happy expression and/or text for identifying the setup of the relation (or group) for the contact person (or his/her phone number) as illustrated in FIG. 25C.

When the user selects 'NO' corresponding to Item No. 2 from the selection button list, the controller 100 detects the selected item in step 3018 and then proceeds to step 3022 to express a feedback for rejecting the setup of a relation (or group) for an associated contact person (or his/her phone number). The feedback for rejecting the setup of a relation (or group) is expressed by a character with a sad expression and text indicating that a relation (or group) for the contact person (or his/her phone number) has not been set up as illustrated in FIG. 25D. When a predetermined time elapses or a predetermined key is input, the expressed character and/or text disappear.

FIG. 15 is a flowchart illustrating an operation for notifying that a substantial number of a call/message-related contact has been made in the wireless terminal in accordance with an exemplary embodiment of the present invention. An operation for notifying that the substantial number of a call (or phone call) or message-related contact with a contact person has been made will be described with reference to FIG. 15. When a call (or phone call) or message-related contact event occurs in idle mode in step 3102, the controller 100 identifies the occurred event in step 3104 and proceeds to step 3106. Here, call (or phone call) and message-related contact events may be phone call termination events, incoming phone call reception events, outgoing phone call transmission events, message reception events, and/or message transmission events. When the phone call termination event occurs, step 3102 may be a state of phone call connection mode.

In step 3106, the controller 100 analyzes call (or phone call) and/or message-related contact records for one recent week. In step 3108, the controller 100 determines if call (or phone call) and/or message-related contact with a contact person (or his/her phone number) has been frequently made at least a threshold number of times (for example, at least three times) for a predetermined period (for example, one week).

If the call (or phone call) and/or message-related contact with an associated contact person (or his/her phone number) has not been made at least a threshold number of times as a determination result in step 3110, the controller 100 proceeds to the step for ending the operation. However, if contact with the associated contact person has been made at least a threshold number of times as a determination result, the operation proceeds to step 3112. In step 3112, the controller 100 identifies the associated contact person (or his/her information), and expresses the selection button list and a character and text for notifying that the number of call (or phone call) and/or message-related contact events associated with the associated contact person (or his/her phone number) is large as illustrated in FIG. 26A.

When the user selects one item of the selection button list, the controller 100 detects the selected item in step 3114 and then proceeds to step 3116 to express a feedback according to a selection button selected by the user. For example, the controller 100 first expresses a feedback mapped to a 'YES' button by expressing a character with a happy expression and text mapped thereto as illustrated in FIG. 26B when the user selects 'YES' corresponding to Item No. 1 from the selection button list. Second, the controller 100 expresses a feedback mapped to a 'Really?' button by expressing a character with a happy expression and/or text mapped thereto as illustrated in FIG. 26C when the user selects 'Really?' corresponding to Item No. 2 from the selection button list. Third, the controller 100 expresses a feedback mapped to a 'Cut it off!' button by expressing a character with an angry expression and/or text mapped thereto as illustrated in FIG. 26D when the user selects 'Cut it off!' corresponding to Item No. 3 from the selection button list. When a predetermined time elapses or a predetermined key is input, the expressed character and/or text disappear.

FIG. 16 is a flowchart illustrating an operation for setting up a relation to a contact person who has made continuous call/message-related contact (or registering the person in a specific group) in the wireless terminal in accordance with an exemplary embodiment of the present invention. An operation for recommending relation setup (or group registration) when continuous call (or phone call) and/or message-related contact with a contact person has been made but a relation to the contact person (or his/her phone number) has not been set up or has not been registered in a specific group, will be described with reference to FIG. 16. When a call (or phone call) or message-related contact event occurs in idle mode in step 3202, the controller 100 identifies the occurred event in step 3204 and proceeds to step 3206. Here, call (or phone call) and message-related contact events may be phone call termination events, incoming phone call reception events, outgoing phone call transmission events, message reception events, and/or message transmission events. When the phone call termination event occurs, step 3202 may be a state of phone call connection mode.

In step 3206, the controller 100 analyzes call (or phone call) and/or message-related contact records for one recent month. In step 3208, the controller 100 determines if the call (or phone call) and/or message-related contact with a contact person (or his/her phone number) has been frequently made at least a threshold number of times (for example, at least seven times) for a predetermined period (for example, one month).

If call (or phone call) and/or message-related contact with an associated contact person (or his/her phone number) has not been made at least a threshold number of times as a determination result in step 3210, the controller 100 proceeds to the step for ending the operation. However, if contact with the associated contact person has been made at least a threshold number of times as a determination result, the operation proceeds to step 3212. In step 3212, the controller 100 determines if relation setup (or registration in a specific group) has been performed for the associated contact person (or his/her phone number) in a contact person list (for example, a phone number list or a phone book). If the associated contact person (or his/her phone number) has been registered in a contact person list (for example, a phone number list, phone book, or specific group) and a relation (or group) has been set as a determination result, the controller 100 proceeds to the step for ending the operation. However, if the associated contact person (or his/her phone number) has not been registered in a contact person list (for example, a phone number list, phone book, or specific group) and the relation (or group) has not been set as a determination result, the controller 100 detects that the contact person has not been registered in step 3214 and proceeds to step 3216. In step 3216, the controller 100 expresses a selection button list and expresses a character and text for recommending the setup of the relation (or group) for an associated contact person (or his/her phone number) of a call (or phone call) and/or message as illustrated in FIG. 27A.

When the user selects 'YES' corresponding to Item No. 1 from the selection button list, the controller 100 detects the selected item in step 3218 and then proceeds to step 3220 to express a feedback for accepting the setup of the relation (or group) for an associated contact person (or his/her phone number). The feedback for accepting the setup of the relation (or group) is expressed by a character with a happy expression and/or an image and text for setting the relation (or group) type as illustrated in FIG. 27B. When the relation (or group) type is set, the controller 100 expresses a character with a happy expression and/or text for identifying the setup of the relation (or group) for the contact person (or his/her phone number) as illustrated in FIG. 27C.

When the user selects 'NO' corresponding to Item No. 2 from the selection button list, the controller 100 detects the selected item in step 3218 and then proceeds to step 3222 to express a feedback for rejecting the setup of the relation (or group) for an associated contact person (or his/her phone number). The feedback for rejecting the setup of the relation (or group) is expressed by a character with a sad expression and text indicating that the relation (or group) for the contact person (or his/her phone number) has not been set up as illustrated in FIG. 27D. When a predetermined time elapses or a predetermined key is input, the expressed character and/or text disappear.

In accordance with an exemplary embodiment, a recommendation can be made for relation setup or group registration associated with a contact person who has made regular contact using a call (or phone call) and/or message (at least a threshold number of times per second predetermined period for a first predetermined period). For example, a determination is made as to whether the relation setup (or group registration) for the contact person has been performed when a call (or phone call) and/or message-related contact with the contact person has been made at least one time per week for one month. If the relation setup (or group registration) for the contact person has not been performed, a character and/or text for recommending the relation setup (or group registration) can be expressed.

FIG. 17 is a flowchart illustrating an operation for setting up an alarm for recommending contact with a specific person who has previously made regular contact but has not recently made contact in the wireless terminal in accordance with an exemplary embodiment of the present invention.

An operation for recommending contact with a specific person who has made regular contact using a call (or phone call) and/or message but has not recently made contact using the call (or phone call) and/or message will be described with reference to FIG. 17.

When the call (or phone call) or message-related contact event occurs in idle mode in step 3302, the controller 100 identifies the occurred event in step 3304 and then proceeds to step 3306. Here, call (or phone call) and message-related contact events may be phone call termination events, incoming phone call reception events, outgoing call transmission events, message reception events, and/or message transmission events. When the phone call termination event occurs, step 3302 may be a state of a phone call connection mode.

In step 3306, the controller 100 analyzes call (or phone call) and/or message-related contact records for one recent month. In step 3310, the controller 100 determines if a regular call (or phone call) and/or message-related contact with the associated contact person has been made (at least a threshold number of times per second predetermined period for the first predetermined period). For example, the controller 100 determines if the regular call (or phone call) and/or message-related contact with the associated contact person (or his/her phone number) has been made at least one time per week for one month.

If the regular call (or phone call) and/or message-related contact with the associated contact person has not been made (at least a threshold number of times (for example, at least one time) per second predetermined period (for example, week) for the first predetermined period (for example, one month) as a determination result, the controller 100 proceeds to the step for ending the operation. However, if the regular call (or phone call) and/or message-related contact with the associated contact person (or his/her phone number) has been made (at least a threshold number of times (for example, at least one time) per second predetermined period (for example, week) for the first predetermined period (for example, one month)) as a determination result, the controller 100 proceeds to step 3312. In step 3312, the controller 100 sets up an alarm (or ID7 alarm) for recommending the call (or phone call) and/or message-related contact with a specific person who has previously made regular contact using a call (or phone call) and/or message but has not recently made contact using a call (or phone call) and/or message. In the ID7 alarm setup, an alarm occurrence time (that is, a predetermined time after three weeks of the third predetermined period from the ID7 alarm setup time) is set, and an associated contact person associated with the ID7 alarm is registered. If the ID7 alarm has been previously set up, the ID7 alarm time is reset to the next occurrence time. The predetermined time after the three weeks may be a period of from a first predetermined time (for example, 30 minutes) before the last contact event of a call (or phone call) and/or message occurs to the contact event time of the call (or phone call) and/or message, a period of from the contact event time of the call (or phone call) and/or message to a second predetermined time (for example, 30 minutes) after the contact event of the call (or phone call) and/or message occurs, or a period of from the first predetermined time to the second predetermined time. For example, the 'ID7 alarm' is set up because the call (or phone call) and/or message-related contact with the associated contact person has been made at least one time in the first week of the month, at least one time in the second week of the month, at least one time in the third week of the month, and at least one time in the fourth week of the month.

FIG. 18 is a flowchart illustrating an operation for recommending contact with a specific person who has previously made regular contact but has not recently made contact in the wireless terminal in accordance with an exemplary embodiment of the present invention.

An operation for processing an alarm event for recommending a call (or phone call) and/or message-related contact with a specific person who has previously made regular contact using a call (or phone call) and/or message, but has not recently made contact using a call (or phone call) and/or message will be described with reference to FIG. 18. When a call (or phone call) or message-related contact event occurs in idle mode in step 3320, the controller 100 identifies the present time in step 3322 and proceeds to step 3324. In step 3324, the controller 100 identifies the occurrence time of the set ID7 alarm event (for recommending a call (or phone call) and/or message-related contact with an associated contact person (or his/her phone number) when regular contact with the contact person has been made a predetermined number of times per second predetermined period, for a first predetermined period, but has not been made for a third predetermined period). If the present time corresponds to the occurrence time of the ID7 alarm event, the controller 100 detects the time in step 3226 and then proceeds to step 3328. In step 3328, the controller 100 analyzes call (or phone call) and/or message-related contact records. In step 3330, the controller 100 determines if the call (or phone call) and/or message-related contact with an associated contact person has been made for a predetermined period (for example, the third predetermined period (three weeks) of from the ID7 alarm setup time to the occurrence time of the ID7 alarm event) before the occurrence time of the ID7 alarm event.

If a call (or phone call) and/or message-related contact with the associated contact person has been made as a determination result, the controller 100 proceeds to the step for ending the operation. However, if the call (or phone call) and/or message-related contact with the associated contact person has not been made as a determination result, the controller 100 proceeds to step 3332. In step 3332, the controller 100 expresses a selection button list and expresses a character and text for recommending call (or phone call) and/or message-related contact with the associated contact person as illustrated in FIG. 28A.

When the user selects 'Phone Call' corresponding to Item No. 1 from the selection button list, the controller 100 detects the selected item in step 3334 and then proceeds to step 3336 to express a feedback for accepting the phone call-related contact with the associated contact person (or his/her contact information). The feedback for accepting the phone call-related contact is expressed by a character with a happy expression and/or an image and text for identifying the acceptance of the phone call-related contact with the associated contact person (or his/her contact information or phone number) as illustrated in FIG. 28B.

When the user selects 'Message' corresponding to Item No. 2 from the selection button list, the controller 100 detects the selected item in step 3338 and then proceeds to step 3340 to express a feedback for accepting a message-related contact with the associated contact person (or his/her contact information). The feedback for accepting the message-related contact is expressed by a character with a happy expression and/or an image and text for identifying the acceptance of the message-related contact with the associated contact person (or his/her contact information or phone number) as illustrated in FIG. 28C.

When the user selects 'NO' corresponding to Item No. 3 from the selection button list, the controller 100 proceeds to step 3342 to express a feedback for rejecting phone call and message-related contact with the associated contact person (or his/her contact information). The feedback for rejecting the phone call and message-related contact is expressed by a character with a sad expression and/or an image and text for identifying the rejection of the phone call and message-related contact with the associated contact person (or his/her contact information or phone number) as illustrated in FIG. 28D. When a predetermined time elapses or a predetermined key is input, the expressed character and/or text disappear.

In accordance with an exemplary embodiment, the ID7 alarm event may occur. The controller 100 sets first and second timers corresponding to reference time parameters in relation to a contact person (or his/her phone number) such that a determination can be made as to whether much or little contact with the contact person has been recently made. When a call (or phone call) and/or message-related contact with the contact person has not been made for periods set in the first and second timers, the controller 100 generates the ID7 alarm event. However, when the call (or phone call) and/or message-related contact with the contact person has been made for the periods set in the first and second timers, the controller 100 does not generate the ID7 alarm event, deletes the first and second set timers, and sets new first and second timers when the call (or phone call) and/or message-related contact with the contact person has been made for the periods set in the first and second timers. Here, the first timer is used for the reference time for detecting the contact person who has made little contact for a shorter period (for example, one week) than that of the second timer, and the second timer is used for the reference time for detecting the contact person who has made little contact for a longer period (for example, one month) than that of the first timer.

For example, if the first timer for the contact person's phone number of '010-234-5673' has timed out as a result of checking the timer at the current reference time (for example, February 7), it means that the first timer has never been updated for one recent week (of February 1~7). This means that transmission to and reception from the phone number of the associated contact person has not been performed for one recent week. In relation to the phone number of '010-234-5673', the number of contact events for a period (for example January 25~31) before two weeks is compared with that of contact events for a period (for example January 18~24) before three weeks. According to a comparison result, a determination is made as to whether little contact with the associated contact person has been made. If the number of contact events for the period before the two weeks is a predetermined ratio, that is, 50%, less than that of contact events for the period before three weeks, a determination is made that little contact with the associated contact person has been made. If the second timer for the contact person's phone number of '010-234-5673' has timed out as a result of checking the timer at the current reference time, it means that the second timer has never been updated for one recent month (for example, March 1~31). In this instance, because a comparison associated with the number of contact events for one recent month is not useful, the number of contact events before two months is compared with that of contact events before three months. If little contact with the associated contact person has been made as a comparison result, contact with a phone number of the associated contact person is recommended and an associated second timer is deleted.

FIG. 19 is a flowchart illustrating an operation for recommending contact with a specific person who has generally made little contact in the wireless terminal in accordance with an exemplary embodiment of the present invention. The operation for recommending contact with a specific person who has generally made little contact will be described with reference to FIG. 19. When an alarm event occurs in idle mode in step 3402, the controller 100 detects the occurred alarm event in step 3404 and then proceeds to step 3406. In step 3406, the controller 100 analyzes the occurred alarm event and determines a type of alarm event. When the occurred alarm event is an ID8 alarm event for recommending contact with a specific person who has generally made little contact, the controller 100 detects the ID8 alarm event in step 3408 and then proceeds to step 3410. In step 3410, the controller 100 resets the occurrence time of the ID8 alarm event. This alarm reset is called and operated in a period of N (one month). For example, when the occurrence time of the alarm event is 2 p.m. on October 10 and the period N is one month, the occurrence time of the next alarm event is 2 p.m. on November 10. The controller 100 analyzes and identifies phone call transmission amounts, phone call reception amounts, message transmission amounts, and message transmission amounts on a contact person-by-contact person basis in step 3412. In step 3414, the controller 100 determines if a specific person who has made little contact for a recent period N (one month) or information of the specific person is present by comparing the number of calls/messages for last month with that of calls/messages for this month on the contact person-by-contact person basis, and determining if a comparison result is less than a preset reference value. Here, if there are a number of associated specific persons, priorities of the specific persons are set and the text can recommend phone call/message-related contact with the specific person of the highest priority, or can recommend sequential contact with the specific persons according to the priorities. Here, priorities are assigned on a phone number-by-phone number basis. For example, when it is assumed that phone numbers of specific persons who have made little contact are phone numbers of an elder brother and an alumnus of an elementary school, the text can recommend contact with the elder brother of the higher priority using his/her phone number.

When an associated specific person is present, the controller 100 proceeds to step 3416. In step 3416, the controller 100 extracts information of the associated specific person, and expresses a selection button list. At this time, a character and text for recommending call/message-related contact with the associated specific person as illustrated in FIG. 29A can be expressed along with the information of the specific person.

When the user selects 'Phone Call' corresponding to Item No. 1 from the selection button list, the controller 100 detects the selected item in step 3418 and then proceeds to step 3420 to express a feedback for accepting phone call-related contact with the associated contact person (or his/her information). The feedback for accepting the phone call-related contact is expressed by a character with a happy expression and/or text for identifying the acceptance of the phone call-related contact with the associated contact person (or his/her information) as illustrated in FIG. 29B.

When the user selects 'Message' corresponding to Item No. 2 from the selection button list, the controller 100 detects the selected item in step 3422 and then proceeds to step 3424 to express a feedback for accepting the message-related contact with the associated contact person (or his/her information). The feedback for accepting the message-related contact is expressed by a character with a happy expression and/or text for identifying the acceptance of the message-related contact with the associated contact person (or his/her information) as illustrated in FIG. 29C.

When the user selects 'NO' corresponding to Item No. 3 from the selection button list, the controller 100 proceeds to step 3426 to express a feedback for rejecting the phone call and message-related contact with the associated contact person using his/her information. The feedback for rejecting the phone call and message-related contact is expressed by a character with a sad expression and/or an image and text for identifying the rejection of the phone call and message-related contact with the associated contact person using his/her information as illustrated in FIG. 29D. When a predetermined time elapses or a predetermined key is input, the expressed character and/or text disappear.

FIG. 20 is a flowchart illustrating an operation for recommending contact with a specific person of a specific group who has recently made little contact in the wireless terminal in accordance with an exemplary embodiment of the present invention. The operation for recommending contact with a specific person of a specific group who has recently made little contact will be described with reference to FIG. 20. When an alarm event occurs in idle mode in step 3502, the controller 100 detects the occurred alarm event in step 3504 and then proceeds to step 3506. In step 3506, the controller 100 analyzes the occurred alarm event and determines a type thereof. When the occurred alarm event is an ID10 alarm event for recommending contact with a specific person of a specific group who has recently made little contact, the controller 100 detects the ID10 alarm event in step 3508 and then proceeds to step 3510. In step 3510, the controller 100 resets the occurrence time of the ID10 alarm event. This alarm reset is called and operated in a period of N (one week). For example, when the occurrence time of the alarm event is 2 p.m. on November 10 and the period N is one week, the occurrence time of the next alarm event is 2 p.m. on November 17.

The controller 100 analyzes and identifies phone call transmission amounts, phone call reception amounts, message transmission amounts, and message transmission amounts on a contact person-by-contact person basis in step 3512. In step 3514, the controller 100 determines if a specific person who has made little contact for a recent period (one week) or information of the specific person is present by comparing the number of calls/messages for last week with that of calls/messages for this week on the contact person-by-contact person basis and determining if a comparison result is less than a preset reference value.

When an associated specific person is present, the controller 100 proceeds to step 3516. In step 3516, the controller 100 extracts information of the associated specific person, and expresses a selection button list. At this time, a character and text for recommending a phone call/message-related contact with the associated specific person as illustrated in FIG. 30A can be expressed along with the information of the specific person.

When the user selects 'Phone Call' corresponding to Item No. 1 from the selection button list, the controller 100 detects the selected item in step 3518 and then proceeds to step 3520 to express a feedback for accepting phone call-related contact with the associated contact person (or his/her information). The feedback for accepting the phone call-related contact is expressed by a character with a happy expression and/or text for identifying the acceptance of the phone call-related contact with the associated contact person (or his/her information) as illustrated in FIG. 30B.

When the user selects 'Message' corresponding to Item No. 2 from the selection button list, the controller 100 detects the selected item in step 3522 and then proceeds to step 3524 to express a feedback for accepting message-related contact with the associated contact person (or his/her information). The feedback for accepting the message-related contact is expressed by a character with a happy expression and/or text for identifying the acceptance of the message-related contact with the associated contact person (or his/her information) as illustrated in FIG. 30C.

When the user selects 'NO' corresponding to Item No. 3 from the selection button list, the controller 100 proceeds to step 3526 to express a feedback for rejecting phone call and message-related contact with the associated contact person (or his/her information). The feedback for rejecting the phone call and message-related contact is expressed by a character with a sad expression and/or an image and text for identifying the rejection of the phone call and message-related contact with the associated contact person (or his/her information) as illustrated in FIG. 30D. When a predetermined time elapses or a predetermined key is input, the expressed character and/or text disappear.

FIG. 21 is a flowchart illustrating an operation for giving notification of the number of calls/messages for this week in the wireless terminal in accordance with an exemplary embodiment of the present invention. An operation for comparing the number of calls/messages for this week with that of calls/messages for last week and giving notification of the number of calls/messages for this week will be described with reference to FIG. 21. When an alarm event occurs in idle mode in step 3602, the controller 100 detects the occurred alarm event in step 3604 and then proceeds to step 3606. In step 3606, the controller 100 analyzes the occurred alarm event and determines a type of alarm event. When the occurred alarm event is an ID39 alarm event for giving notification of the number of calls/messages for this week, the controller 100 detects the ID39 alarm event in step 3608 and then proceeds to step 3610.

In step 3610, the controller 100 resets the occurrence time of the ID10 alarm event after N weeks (for example, at 21:00 on Saturday of the next week). This alarm reset is called in a period of N and is operated at 21:00 on Saturday of the next week. For example, when the occurrence time of the alarm event is 21:00 on Saturday, November 20 and the period N is one week, the occurrence time of the next alarm event is 21:00 on Saturday, November 27.

In step 3612, the controller 100 identifies, compares and analyzes phone call transmission amounts, phone call reception amounts, message transmission amounts, and message transmission amounts for a period of last week (that is, a first predetermined period) and a period of this week (that is, a second predetermined period). In step 3614, the controller 100 obtains information of a result of comparing and analyzing phone call transmission amounts, phone call reception amounts, message transmission amounts, and message transmission amounts for the period of last week (that is, the first predetermined period) and the period of this week (that is, the second predetermined period), and then expresses the information of the result of the comparison and analysis in the form of a character, text and graph as illustrated in FIG. 31. The information of the result of the comparison and analysis can be expressed in a numerical value. If the number of phone calls for this week is more than that of phone calls for last week, or the number of messages for this week is more than that of messages for last week, a character with a happy expression and text mapped can be expressed. However, if the number of phone calls for this week is less than that of phone calls for last week, or the number of messages for this week is less than that of messages for last week, a character with a sad expression and text mapped can be expressed. When a predetermined time elapses or a predetermined key is input, the expressed character and/or text disappear.

FIG. 22 is a flowchart illustrating an operation for giving notification of the number of calls/messages for this month in the wireless terminal in accordance with an exemplary embodiment of the present invention. An operation for comparing the number of calls/messages for this month with that of calls/messages for last month and giving notification of the number of calls/messages for this month will be described with reference to FIG. 22. When an alarm event occurs in idle mode in step 3702, the controller 100 detects the occurred alarm event in step 3704 and then proceeds to step 3706. In step 3706, the controller 100 analyzes the occurred alarm event and determines a type of alarm event. When the occurred alarm event is an ID40 alarm event for giving notification of the number of calls/messages for this month, the controller 100 detects the ID40 alarm event in step 3708 and then proceeds to step 3710. In step 3710, the controller 100 resets the occurrence time of the ID40 alarm event after N weeks (for example, 21:00 on the last day of the next month). This alarm reset is called and operated in a period N of one month and is called and operated at 21:00 on the last day of the next month. Accordingly, the ID40 alarm event is repeatedly called and operated in a period of one month. For example, when the occurrence time of the alarm event is 21:00 on October 31 and the period N is one month, the occurrence time of the next alarm event is 21:00 on November 30.

In step 3712, the controller 100 identifies, compares and analyzes phone call transmission amounts, phone call reception amounts, message transmission amounts, and message transmission amounts for a period of last month (that is, a first predetermined period) and a period of this month (that is, a second predetermined period).

In step 3714, the controller 100 obtains information of a result of comparing and analyzing phone call transmission amounts, phone call reception amounts, message transmission amounts, and message transmission amounts for the period of last month (that is, the first predetermined period) and the period of this month (that is, the second predetermined period). The controller 100 then expresses the information of the result of the comparison and analysis in the form of a character, text and graph as illustrated in FIG. 32. The information of the result of the comparison and analysis can be expressed in a numerical value. If the number of phone calls for this month is more than that of phone calls for last month, or the number of messages for this month is more than that of messages for last month, a character with a happy expression and text mapped can be expressed. However, if the number of phone calls for this month is less than that of phone calls for last month or the number of messages for this month is less than that of messages for last month, a character with a sad expression and text mapped can be expressed. When a predetermined time elapses or a predetermined key is input, the expressed character and/or text disappear.

FIG. 23 is a flowchart illustrating an operation for giving notification indicating if some work on today's TO-DO list has been completed in the wireless terminal in accordance with an exemplary embodiment of the present invention. The TO-DO list indicates today's work items registered for a schedule management function. When some work registered in the TO-DO list is performed, a result of execution completion can be automatically or manually recognized. For example, some work on the TO-DO list may be event registration for making phone call-related contact with a specific person at a specific time and event registration for making message-related contact with a specific person at a specific time.

The operation for giving notification indicating if some work on today's TO-DO list has been completed will be described with reference to FIG. 23. When an alarm event occurs at a set specific time (of a first specific time, that is, 10 p.m.) today (that is, a first predetermined time) in idle mode in step 3802, the controller 100 detects the occurred alarm event in step 3804 and then proceeds to step 3806. In step 3806, the controller 100 analyzes the occurred alarm event and determines a type thereof. When the occurred alarm event is an ID33 alarm event for giving notification indicating if some work on today's TO-DO list (mapped to the first predetermined period) has been completed, the controller 100 detects the ID33 alarm event in step 3808 and then proceeds to step 3810. In step 3810, the controller 100 resets the occurrence time of the ID33 alarm event. This alarm reset is called in a period N of one day and is operated at 22:00 on the next day. For example, when the occurrence time of the alarm event is 22:00 on October 10 and the period N is one day, the occurrence time of the next alarm event is 22:00 on October 11.

In step 3812, the controller 100 analyzes and identifies work items registered in today's TO-DO list (mapped to the first predetermined period). In step 3814, the controller 100 determines if an undone work item of the work items registered in today's TO-DO list (mapped to the first predetermined period) is present. If an undone work item of the work items registered in today's TO-DO list (mapped to the first predetermined period) is present as a determination result, the controller 100 proceeds to step 3816. In step 3816, the controller 100 extracts the undone work item of the TO-DO list, and expresses a selection button list and a character and text for recommending a check of the undone work item of the TO-DO list as illustrated in FIG. 33A.

When the user selects 'YES' corresponding to Item No. 1 from the selection button list, the controller 100 detects the selected item in step 3818 and then proceeds to step 3820 to express a feedback for accepting the check of the undone work item of the TO-DO list. The feedback for accepting the check of the undone work item of the TO-DO list is expressed by a character with a happy expression and/or text for identifying the acceptance of the check of the undone work item of the TO-DO list as illustrated in FIG. 33B.

When the user selects 'NO' corresponding to Item No. 2 from the selection button list, the controller 100 detects the selected item in step 3818 and then proceeds to step 3822 to express a feedback for rejecting the check of an undone work item of the TO-DO list. The feedback for rejecting the check of an undone work item of the TO-DO list is expressed by a character with a sad expression and/or text indicating that the undone work item of the TO-DO list has not been checked as illustrated in FIG. 33C. When a predetermined time elapses or a predetermined key is input, the expressed character and/or text disappear.

FIG. 24 is a flowchart illustrating an operation for giving notification indicating if some work on yesterday's TO-DO list has been completed in the wireless terminal in accordance with an exemplary embodiment of the present invention. The operation for giving notification indicating if some work on yesterday's TO-DO list has been completed will be described with reference to FIG. 24. When an alarm event occurs at a set specific time (of a second specific time, that is, 8 a.m.) today in idle mode in step 3902, the controller 100 detects the occurred alarm event in step 3904 and then proceeds to step 3906. In step 3906, the controller 100 analyzes the occurred alarm event and determines a type of alarm event. When the occurred alarm event is an ID34 alarm event for giving notification indicating if some work on yesterday's TO-DO list (mapped to a first predetermined period) has been completed, the controller 100 detects the ID34 alarm event in step 3908 and then proceeds to step 3910. In step 3910, the controller 100 resets the occurrence time of the ID34 alarm event. This alarm reset is called in a period N of one day and is operated at 8 a.m. on the next day. For example, when the occurrence time of the alarm event is 8 a.m. on November 10 and the period N is one day, the occurrence time of the next alarm event is 8 a.m. on November 11.

In step 3912, the controller 100 analyzes and identifies work items registered in yesterday's TO-DO list (mapped to the first predetermined period). In step 3914, the controller 100 determines if an undone work item of the work items registered in yesterday's TO-DO list (mapped to the first predetermined period) is present. If an undone work item of the work items registered in the TO-DO list, yesterday's TO-DO list (mapped to the first predetermined period) is present as a determination result, then the controller 100 proceeds to step 3916. In step 3916, the controller 100 extracts the undone work item of the TO-DO list, and expresses a selection button list and a character and text for recommending a check of the undone work item of the TO-DO list as illustrated in FIG. 34A.

When the user selects 'YES' corresponding to Item No. 1 from the selection button list, the controller 100 detects the selected item in step 3918 and then proceeds to step 3920 to express a feedback for accepting the check of an undone work item of the TO-DO list. The feedback for accepting the check of the undone work item of the TO-DO list is expressed by a character with a happy expression and/or text for identifying the acceptance of the check of the undone work item of the TO-DO list as illustrated in FIG. 34B.

When the user selects 'NO' corresponding to Item No. 2 from the selection button list, the controller 100 detects the selected item in step 3918 and then proceeds to step 3922 to express a feedback for rejecting the check of an undone work item of the TO-DO list. The feedback for rejecting the check of an undone work item of the TO-DO list is expressed by a character with a sad expression and/or text indicating that the undone work item of the TO-DO list has not checked as illustrated in FIG. 34C. When a predetermined time elapses or a predetermined key is input, the expressed character and/or text disappear.

In accordance with exemplary embodiments of the present invention as described above, a character agent function is added to a wireless terminal and an avatar user interface (UI) for generating and processing an event, is expressed when an event occurs in the wireless terminal, such that call and message-related events occurring in the wireless terminal can be expressed through the character agent function.

In accordance with the embodiment of the present invention as described above, an operation for processing a phone call/message-related event can be performed in the wireless terminal. While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for processing events for a wireless terminal, the method comprising:
   in response to an occurrence of a communication event at the wireless terminal,
      determining whether a number of the occurred communication event is more than a threshold number;
      determining identification information related to the communication event, if the number of the occurred communication event is more than the threshold number; and
      displaying a user interface (UI) for recommending registering the identification information to a user of the wireless terminal if the identification information relating to the communication event is not registered.

2. The method of claim 1, further comprising:
   providing an indication of the occurrence of the communication event.

3. The method of claim 1, further comprising:
   determining whether the identification information associated with the communication event is the registered identification information.

4. The method of claim 1, wherein the displaying of the UI for the recommending of registering the identification information occurs in response to determining that the identification information associated with the communication event is not registered identification information.

5. The method of claim 1, further comprising:
   receiving an indication whether to register the identification information.

6. The method of claim 5, wherein the indication corresponds to selection of a button on the UI associated with registering identification information.

7. The method of claim 5, further comprising:
   registering, in the event that the indication whether to register the identification information corresponds to an indication that the identification information is to be registered, the identification information as registered identification information.

8. The method of claim 1, wherein the displaying of the UI for the recommending of registering the identification information comprises displaying, on the UI, a button to add the identification information.

9. The method of claim 1, wherein the registered identification information corresponds to identification information that is associated with a user profile of the user.

10. The method of claim 1, further comprising:
    detecting the occurrence of the communication event.

11. An apparatus for processing events for a wireless terminal, the apparatus comprising:
    in response to an occurrence of a communication event at the wireless terminal, one or more controllers operatively configured to:
       determine whether a number of the occurred communication event is more than a threshold number;
       determine identification information related to the communication event, if the number of the occurred communication event is more than the threshold number; and
       control a display unit to display a user interface (UI) for recommending registering the identification information to a user of the wireless terminal if the identification information relating to the communication event is not registered.

12. The apparatus of claim 11, wherein the one or more controllers are further operatively configured to provide an indication of the occurrence of the communication event.

13. The apparatus of claim 11, wherein the one or more controllers are further operatively configured to determine whether the identification information associated with the communication event is the registered identification information.

14. The apparatus of claim 11, wherein the one or more controllers are further operatively configured to display the UI for the recommending of registering the identification information in response to determining that the identification information associated with the communication event is not registered identification information.

15. The apparatus of claim 11, wherein the one or more controllers are further operatively configured to receive an indication whether to register the identification information.

16. The apparatus of claim 15, wherein the indication corresponds to selection of a button on the UI associated with registering the identification information.

17. The apparatus of claim 15, wherein the one or more controllers are further operatively configured to register the identification information as the registered identification information in the event that the indication whether to register the identification information corresponds to an indication that the identification information is to be registered.

18. The apparatus of claim 11, wherein the one or more controllers are further operatively configured to display the identification information by displaying, on the UI, a button to add the identification information.

19. The apparatus of claim 11, wherein the registered identification information corresponds to identification information that is associated with a user profile of the user.

20. The apparatus of claim 11, wherein the one or more controllers are further operatively configured to detect the occurrence of the communication event.

* * * * *